United States Patent
Polonsky et al.

(10) Patent No.: US 7,072,984 B1
(45) Date of Patent: Jul. 4, 2006

(54) SYSTEM AND METHOD FOR ACCESSING CUSTOMIZED INFORMATION OVER THE INTERNET USING A BROWSER FOR A PLURALITY OF ELECTRONIC DEVICES

(75) Inventors: Leonid Polonsky, Wilmette, IL (US); Francis Edward Simon Hunt, Naperville, IL (US); James Richard Werwath, Schaumburg, IL (US); Kevin Nigel Wallace, Bartlett, IL (US); Matthew Frank Trapani, Deerfield, IL (US)

(73) Assignee: Novarra, Inc., Arlington Heights, IL (US)

( * ) Notice: Subject to any disclaimer, the term of this patent is extended or adjusted under 35 U.S.C. 154(b) by 659 days.

(21) Appl. No.: 09/842,474

(22) Filed: Apr. 25, 2001

Related U.S. Application Data

(60) Provisional application No. 60/199,858, filed on Apr. 26, 2000.

(51) Int. Cl.
*G06F 15/16* (2006.01)
*G06F 15/00* (2006.01)

(52) U.S. Cl. .................. 709/246; 709/217; 715/523

(58) Field of Classification Search ........... 709/246, 709/240, 230, 245, 217–229, 200–207, 238; 707/10, 1; 345/866, 864, 804, 744, 746, 345/1.1, 156; 713/171; 455/414, 435, 412.1; 715/517–523; 370/229–240
See application file for complete search history.

(56) References Cited

U.S. PATENT DOCUMENTS

| 5,961,590 | A  | * | 10/1999 | Mendez et al. .......... 709/206 |
| 6,182,142 | B1 | * | 1/2001  | Win et al. ............... 709/229 |
| 6,212,550 | B1 | * | 4/2001  | Segur ..................... 709/206 |
| 6,239,797 | B1 | * | 5/2001  | Hills et al. .............. 715/784 |
| 6,300,947 | B1 | * | 10/2001 | Kanevsky ................ 345/866 |

(Continued)

FOREIGN PATENT DOCUMENTS

AU          714951         8/1998

(Continued)

OTHER PUBLICATIONS

International Search Report for PCT/US03/33608 mailed Apr. 8, 2004.

(Continued)

*Primary Examiner*—Saleh Najjar
*Assistant Examiner*—Asad Muhammad Nawaz
(74) *Attorney, Agent, or Firm*—McDonnell Boehnen Hulbert & Berghoff LLP

(57) ABSTRACT

A system and method is provided for enabling an electronic device to efficiently access information content. A server browser accesses the information content over a network. The accessed information content is retrieved and adapted for presentation for the electronic device. A serializer dynamically formats the adapted information content according to a client browser. The client browser receives and presents the information content on the electronic device. An event translator is included to provide additional compatibility with commercially available client browsers.

56 Claims, 9 Drawing Sheets

U.S. PATENT DOCUMENTS

| | | | |
|---|---|---|---|
| 6,308,201 B1* | 10/2001 | Pivowar et al. | 709/214 |
| 6,311,215 B1* | 10/2001 | Bakshi et al. | 709/221 |
| 6,401,132 B1* | 6/2002 | Bellwood et al. | 709/246 |
| 6,430,624 B1* | 8/2002 | Jamtgaard et al. | 709/246 |
| 6,563,517 B1* | 5/2003 | Bhagwat et al. | 345/735 |
| 6,615,212 B1* | 9/2003 | Dutta et al. | 707/10 |
| 6,643,697 B1* | 11/2003 | Eves et al. | 709/225 |
| 6,670,973 B1* | 12/2003 | Hill et al. | 715/853 |
| 6,684,257 B1* | 1/2004 | Camut et al. | 709/246 |
| 6,775,772 B1* | 8/2004 | Binding et al. | 713/171 |
| 6,868,447 B1* | 3/2005 | Slaughter et al. | 709/225 |
| 6,873,841 B1* | 3/2005 | Sagar | 455/414.4 |
| 2001/0011364 A1 | 8/2001 | Stoub | 717/1 |
| 2002/0073119 A1 | 6/2002 | Richard | 707/513 |

FOREIGN PATENT DOCUMENTS

| | | |
|---|---|---|
| CA | 2278194 | 7/1998 |
| EP | 0 442 838 | 8/1991 |
| EP | 0 826 610 A1 | 6/1999 |
| EP | 0 949 571 A2 | 10/1999 |
| EP | 0 969 389 A2 | 1/2000 |
| EP | 1 122 654 A2 | 8/2001 |
| GB | 2 329 310 A | 3/1999 |
| GB | 2 339 347 A | 1/2000 |
| GB | 2 366 037 A | 2/2002 |
| WO | WO 98/33130 | 7/1998 |
| WO | WO 99/57657 | 11/1999 |
| WO | WO 00/39666 | 12/1999 |
| WO | WO 01/89171 A2 | 11/2001 |
| WO | WO 01/93097 A2 | 12/2001 |
| WO | WO 02/21331 A1 | 3/2002 |
| WO | WO 20/45374 A2 | 6/2002 |
| WO | WO 02/087135 A2 | 10/2002 |

OTHER PUBLICATIONS

Bickmore, et al., "Web Page Filtering and Re-Authoring for Mobile Users," The Computer Journal, vol. 42, No. 6, 1999, pp. 534-546.

Hori, et al., "Annotation-based Web content transcoding," Computer Networks 33 (2000) 197-211.

U.S. Appl. No. 60/199,858, filed Apr. 26, 2000, Trapani et al.

R. Mohan, et al., "Adapting Multimedia Internet Content for Universal Access", International Business Machines Corporation T.J. Watson Research Center (35 pages).

A. Luotonen, et al., "World-Wide Web Proxies", Computer Networks and ISDN Systems, vol. 2, No. 27, Nov. 1994 (8 pages).

B. N. Schilit, et al., "TeleWeb: Loosely Connected Access to the World Wide Web", Computer Networks and ISDN Systems, vol. 11, No. 28, May 1996 (14 pages).

Tim Hyland, Unwired Planet, "Proposal for a Handheld Device Markup Language", www.w3.org/Submission/1997/5, submitted May 9, 1997, printed Oct. 31, 2001 (4 pages).

J. R. Smith, et al. (1998), "Transcoding Internet Content for Heterogeneous Client Devices", IEEE International Conference on Circuits and Systems (4 pages).

Chris Oakes, "HDML, Take Two", www.wired.com/news/news/story/12173.html, published May 11, 1998, (3 pages).

Special Report (1999), "IBM Transcoding Solution and Service: Extending the Reach and Exploiting the Value of Data", International Business Machines Corporation (8 pages).

"Spyglass Solutions for Mobile Data Services", www.spyglass.com/industry/mdexpert/pr_wp.html, printed Sep. 12, 2000 (12 pages).

"Microsoft Wireless Solutions: Making information more accessible, to more people, at anytime, through any device", Bell Mobility—Wireless Data & Internet, www.bellmobility.ca/ps/wiredat/overview/dev/white/mswirelesssolutions.asp, printed Sep. 12, 2000 (15 pages).

"alphaWorks: LotusXSL", www.alphaworks.ibm.com/formula/LotusXSL, printed Oct. 25, 2001 (2 pages).

"The Extensible Stylesheet Language (XSL)", www.w3.org/Style/XSL, printed Oct. 25, 2001 (3 pages).

W3C: World Wide Web Consortium, www.w3.org, printed Oct. 30, 2001 (4 pages).

VoiceXML Forum, www.voiceml.org, printed Oct. 30, 2001 (2 pages).

* cited by examiner

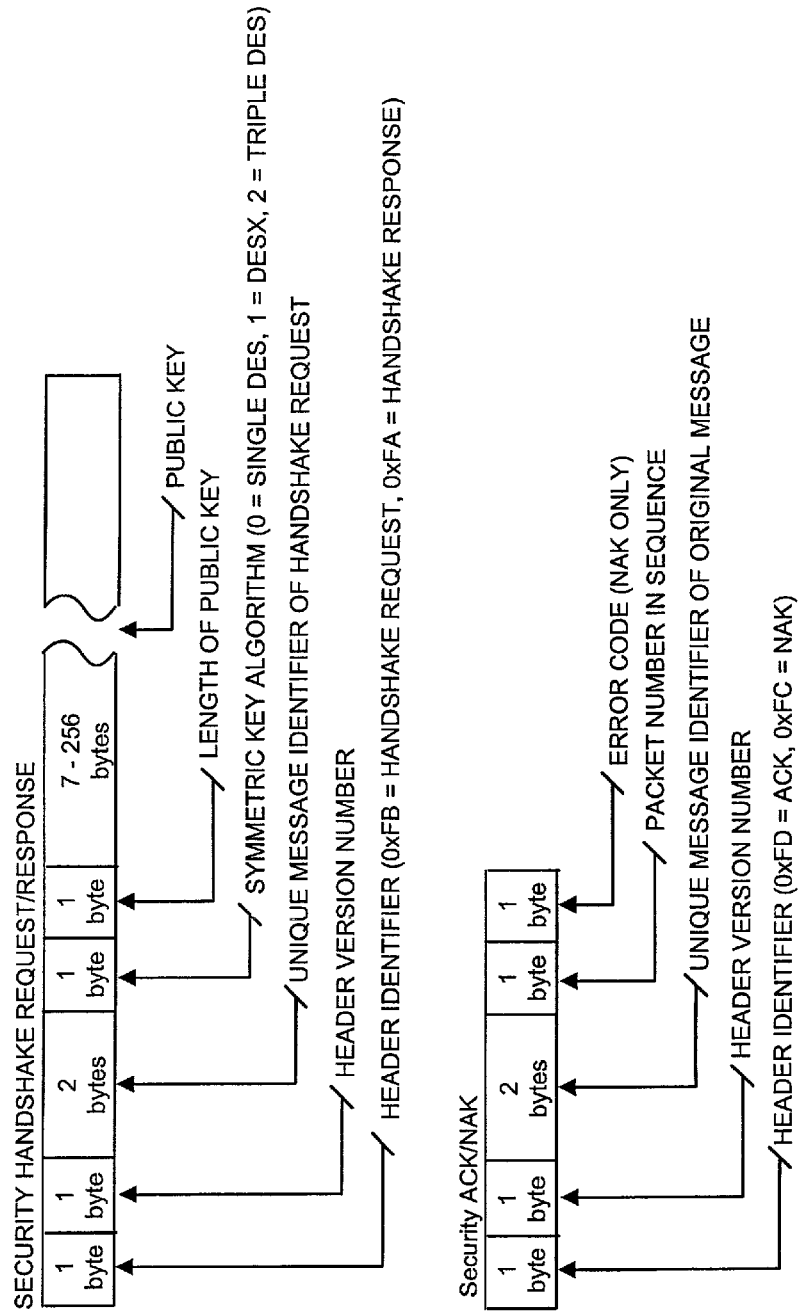

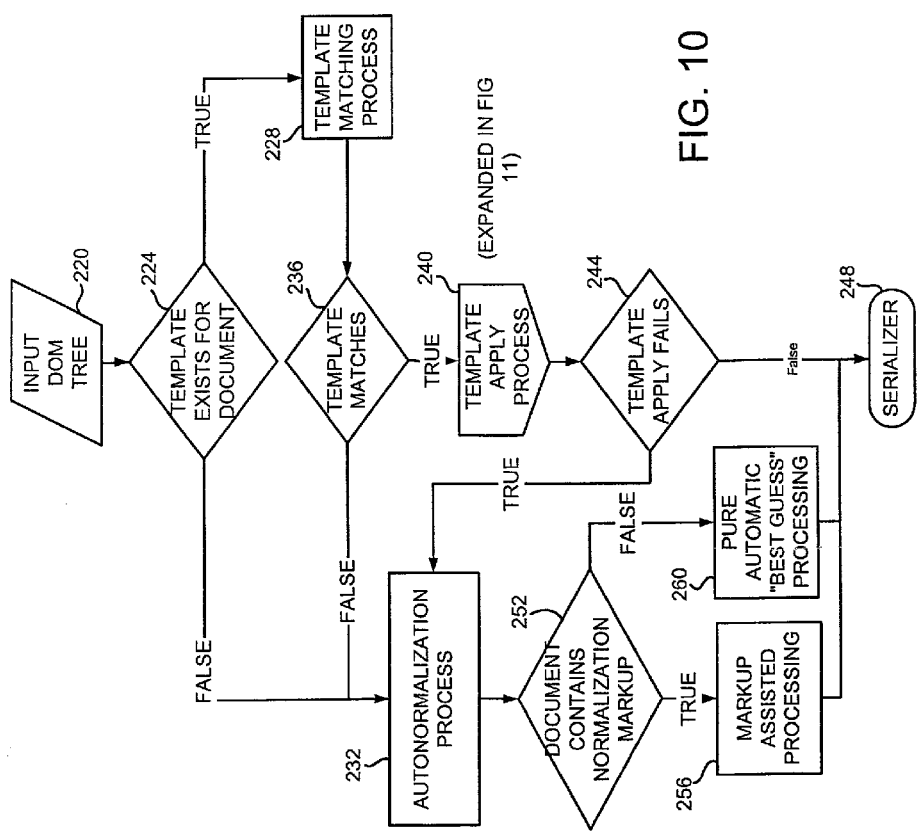

SYSTEM AND METHOD FOR ACCESSING CUSTOMIZED INFORMATION OVER THE INTERNET USING A BROWSER FOR A PLURALITY OF ELECTRONIC DEVICES

REFERENCE TO RELATED APPLICATIONS

This application claims priority to U.S. provisional application Ser. No. 60/199,858 filed on Apr. 26, 2000.

FIELD OF THE INVENTION

This present invention relates generally to the field of network communications. More specifically, it relates to a system and method for accessing, adapting, and presenting information content for electronic devices.

BACKGROUND OF THE INVENTION

Today, an abundant amount of meaningful and feature rich information content is truly at one's fingertips. Currently, using a personal computer (PC) and PC-based browser, one can find information online regarding just about anything they desire. One can communicate with people on the other side of the U.S. or world, set up a teleconference call, tap into the resources of other computers across the earth, search through the world's finest libraries, and visit images from the world's most remarkable museums. One can even use the PC-based browser to watch videos and listen to their favorite music, monitor the financial markets, find the local weather forecast, go shopping, download application software, and so on. Currently, all of this can be done with a personal computer and a PC-based browser that is tapped into a feature rich network of computers such as the Internet, Intranet, or Extranet.

At the same time, the field of communications, and more specifically wireless telecommunications, is currently undergoing a radical expansion. This technological expansion allows an electronic device, such as mobile personal digital assistant (PDA), cellular phone, pager, and other electronic devices to connect to the same information sources, such as a web server or database, as one could with the PC and a PC-based browser.

Unfortunately, this feature rich information content was developed for a standard PC-based browser, not a mobile or portable electronic device that might be limited in memory, screen size, bandwidth, navigation capabilities, power consumption, processing power, etc. For example, an electronic device, such as portable PDA, with a small screen size may be inappropriate to display the same information content originally intended for a PC-based browser, and viewed on a 15-inch or greater size display monitor. Consequently, the PDA can not be able to faithfully access and display information content as it was originally intended to be viewed. Therefore, it would be desirable to access, organize, and navigate information content including applications.

In another example, a mobile or wireless device with only low bandwidth capability may be unable to view information content intended for only high bandwidth applications. Parameters such as the mobile or wireless device's network connection, memory capacity, power restrictions, or other limitations of the device may require customization of information content that is delivered to or from the device. Therefore, it would be desirable to streamline the information content such that the desired content is received and presented at the mobile device as it was intended to be viewed.

In yet another example, current electronic devices cannot take full advantage of dynamically generated content and interactive Web sites that are typically hosted on today's Web servers. According to this example, scripting languages like JavaScript or Jscript allow a user on a PC-based browser to interact with markup language such as Hypertext Markup Language (HTML) source code, thus enabling the use of dynamic content. However, it would be desirable for a portable electronic device, although possibly having limited abilities, to also utilize the modern and current scripting languages.

Currently, information content is sent to the device, but often in a format that the appliance, user, or network cannot conveniently accommodate, which produces undesirable results. For example, the data content might be unreadable on the display, displayed in an unorganized fashion, be too voluminous or bandwidth intensive to be received or displayed, and so on.

Thus, it would be desirable to transparently extend internet and intranet technologies to an electronic device over a wired or wireless domain.

SUMMARY OF THE INVENTION

A system and method is provided that enables electronic devices with limited hardware or network capability to successfully access the same feature rich information content as full featured PC-based browsers with a large display screen, extensive user input facilities (e.g., mouse, keyboard, etc), high CPU power, large memory, reliable network connections, a reliable power supply, and so on.

In an aspect of the present embodiment, the system enables an electronic device to access a number of different information sources including, but not limited to, marked up content like HTML, XML, WML, voice and multimedia. In the exemplary embodiment, a script execution engine is utilized to support scripting technologies such as JavaScript that dynamically generate content.

According to another aspect of the present embodiment, a distributed browser includes separable components, a server browser and a client browser, that enable an electronic device with a small display to efficiently access information content. In the exemplary embodiment, the server browser and the client browser work together to access the information content by separating functionality between the browsers, irrespective of the component's location. Preferably, the functionality applied to optimize information content access, arrangement, transmission, and navigation can be performed by the server browser rather than the client browser hosted on the portable or mobile device. In this manner the client browser and server browser work together to access the information content, with the server browser performing a majority of the required tasks.

According to another aspect of the present embodiment, a QDOM converts data content into a document object tree represented by a mutable object having an array structure. Based on the nodes of the object tree, the QDOM generates an array of primitive data types for efficiently developing an optimized standard structure for use by a normalizer or other processing modules. In the manner, the QDOM extends the World Wide Web Consortium (W3C) DOM interface definition to an efficient model that provides high speed parsing, storage, and access while minimizing memory resource requirements.

In another aspect of the present embodiment, a normalizer adaptively tailors and folderizes markup based information content to accommodate an electronic device's particular software, hardware, and network characteristics. In the exemplary embodiment, the normalizer organizes any markup based information content into folders of interest. The user of the electronic device can then further explore the folders of interest as desired.

In yet another aspect of the present embodiment, metatags embedded in a markup language at the information source can provide instructions to the normalizer to take appropriate actions. Use of metatags can allow customization of original information content if a modified outcome is desired at the electronic device. In the exemplary embodiment, the metatags provide instruction to an automatic normalizer including, but not limited to, direct output of information content without normalization, the promotion of content into or out of folders, and dropping or filtering information content from the serialized output to an electronic device.

In another aspect of the present embodiment, pattern-matching templates are utilized to normalize the presentation of accessed information content. In the exemplary embodiment, a template normalizer utilizes regular expression pattern-matching to impose a template over a document and attempts to match the template to the document.

In another aspect of the present invention, an event translator provides additional compatibility with commercially available client browsers or end user applications that employ standardized protocols. In the exemplary embodiment, the event translator can be utilized on the server browser or the client browser to provide compatibility with standard client browsers.

In an aspect of the present embodiment, a serializer dynamically formats normalized content to a form that is optimized for a particular electronic device. The serialized output can be formatted to suit industry standard browsers, or targeted to an electronic device using the client side browser. The serializer may also dynamically format the same accessed information or normalized content for a second client side browser.

The present embodiments allow for electronic devices with limited hardware capability to access, on the fly, feature rich static and dynamic content, and applications. The server browser enables a client browser that utilizes a particular markup language to access information content that is of any type of markup language or technology. The distributed browser minimizes the functionality required on the device and implements the CPU and memory intensive functions on a server in the network, thus allowing wireless devices, with intermittent, limited connectivity, processing power capability etc. to provide a similar experience achieved with a desktop PC.

Multiple components including a serializer, normalizer, client browser, and/or the event translator work in conjunction with each other to convert user events within one markup domain into another markup domain while staying in the transaction to translate the meaning of the interaction appropriately. Thus, for example, user events such as scrolling, clicking, voice commands interact with the QDOM to result in a change in presentation of the content.

Additionally, the present embodiments provide significantly higher speed and an efficient use of network bandwidth as desired information content can be cached on the server browser and on the client browser, if so desired, to enable quick access to the desired portions of the information content.

The present embodiments also provide for server browser-centric access to user profile and client browser state information (such as cookies), thereby facilitating the use of multiple devices by a single user.

The present embodiments provide a number of advantages and applications as will be more apparent to those skilled in the art. The exemplary embodiments utilize distributed architecture for adaptively tailoring information content to electronic device's hardware and network characteristics.

BRIEF DESCRIPTION OF THE DRAWINGS

FIG. 7 is a diagram illustrating a security handshake request/response and ACK/NAK message utilized in the exemplary system of FIG. 1;

FIG. 10 is a diagram illustrating the process of the normalizer of FIG. 1;

DETAILED DESCRIPTION OF PREFERRED EMBODIMENTS

Figure 1:
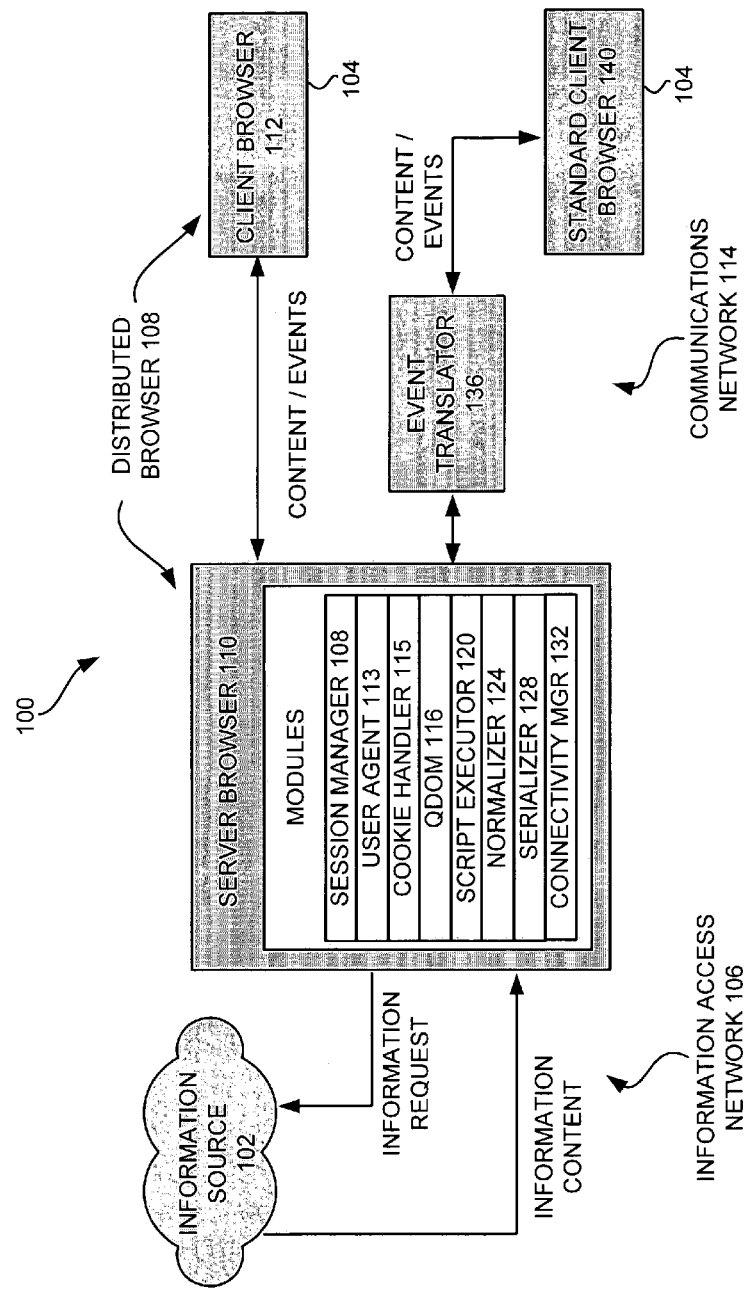
FIG. 1 is a high-level diagram illustrating an exemplary system for accessing, adapting, and presenting information content to electronic devices.

FIG. 1 shows a high-level block diagram illustrating an exemplary system 100 for accessing and adapting feature rich information content for presentation on an electronic device 104. The accessed and adapted information content is transmitted between an information source 102 and the electronic device 104.

The information source 102 includes any type of device such as a web server, application server, database or other backend system, or any interface to an information provider. Preferably, the information source 102 provides information content expressed in a markup language, such as those markup languages known in the art including Hypertext Markup Language (HTML), Extensible Markup Language (XML) with or without Extensible Style Sheets (XSL), VoiceXML, Extensible Hypertext Markup Language (XHTML), or Wireless Markup Language (WML). Furthermore, the information content can store images, video, audio information. Preferably, the information source 102 can be accessed through an information access network 106 such as a local area network (LAN) or wide area network (WAN).

The electronic device 104 includes any type of device such as a personal computer (PC), wireless telephone, personal digital assistant (PDA), hand-held computer, network appliance, and a wide variety of other types of electronic devices that might have navigational capability (e.g., keyboard, touch screen, mouse, etc.) and an optional display for viewing downloaded information content. Furthermore, the electronic device 104 can also include a device such as a set-top box, internet access appliance, infra-red remote control used with a set-top box, and so forth. Moreover, the electronic device 104 can include any type of device that has the capability to utilize speech synthesis markups such as W3C (www.w3.org) Voice Extensible Markup Language (VoiceXML).

Information content from the information source 102 is preferably retrieved and tailored for use on the electronic device 104 by a distributed browser 108. The distributed browser 108 is generally made up of a server browser 110 and a client browser 112. By utilizing the distributed browser 108, smaller electronic devices with limited hardware capability can access feature rich information or data. Moreover, the distributed browser 108 allows for efficient use of the communications network 114 bandwidth. Of course, electronic devices with high processing power, fast network connection, and large memory can also use the present embodiments.

In the exemplary embodiment, the server browser 110 and the client browser 112 are hosted on separate platforms. For example, the server browser 110 might be hosted on a back-end server, and the client browser 112 might be hosted on the electronic device 104. However, it should be understood that the server browser 110 and client browser 112 can be hosted on the same platform such as on an electronic device, especially if the platform or electronic device has the appropriate hardware and network capabilities.

The server browser 110 can access information content at the information source 102 via the information access network 106. In the exemplary embodiment, the server browser 110 operates as a client of the information source 102. For example, using a known suite of communications protocols such as Transmission Control Protocol/Internet Protocol (TCP/IP), the server browser 110 can issue a Hypertext Transfer Protocol (HTTP) request to the information source 102 over the information access network 106. By utilizing HTTP requests, such as is known in the art, the server browser 110 can access information content, including applications, static and dynamic content, at the information source 102. Dynamic content can include script codes such as JavaScript, developed by Netscape (www.netscape.com), and Jscript, developed by Microsoft (www.microsoft.com).

Preferably, communications between the client and server browsers 112 and 110, respectively, are via a defined application protocol implemented on top of a wired or wireless transport layer depending on the nature of the electronic device 104 and communications network 114.

Therefore, the communications network 114 might include a wired network such as those that utilize Ethernet or similarly IEEE 802.3 protocols. The communications network 114 might also include a wireless network such as a local area wireless network (LAWN) or wireless local area network (WLAN). Moreover, the communications network 114 might include wireless networks that utilize other known protocols and technologies such as Bluetooth, wireless application protocol (WAP), time division multiple access (TDMA), or code division multiple access (CDMA). Furthermore, the communications network 114 is not limited to terrestrial networks, but can utilize other forms of transmission, as is known in the art, such as a satellite connection.

To provide an exemplary illustration, assume that a PDA hosts a client browser, a PC hosts a server browser, and the PDA and PC are both connected to an Ethernet network. Then, the client browser and the server browser could perform information transactions over the Ethernet network. Such transactions would utilize Ethernet or similarly IEEE 802.3 protocols. Nevertheless, in this example, the client and server browsers communicate over a wired network.

In another example, assume that an internet-enabled refrigerator hosts a client browser, a set-top box hosts a server browser, and both could perform information transactions over a Bluetooth or IEEE 802.11 wireless LAN. Then, according to this example, the client and server browsers are communicating over a wireless network.

Referring again to FIG. 1, a commercially available or standard client browser 140 can also be supported. Preferably, an event translator 136 is used to convert a request/response protocol, such as an HTTP request, from the standard client browser 140 (e.g., WML, XHTML, cHTML, etc.) to an event that the server browser 110 recognizes. Preferably, the translation process includes event information, content information, and the context of the event such that transactions between the standard client browser 140 and the information source 102 (e.g. HTML form submission) are preserved. Therefore, by using the event translator 136, the server browser 110 can provide an interface to any end user application with a known protocol. Thus, for example, an electronic device 104 can utilize the client browser 112 or standard client browser 140, or both at the same time, if so desired.

The server browser 110 can be hosted on any platform with sufficient hardware capability for performing tasks by the server browser 110 described herein. Such platforms can include but are certainly not limited to desktop or laptop PCs, servers, computer clusters, or embedded devices. It should also be understood that the server browser 110 can also be hosted on the electronic device 104, especially if the electronic device has the hardware and network connection capability.

According to the exemplary embodiment, the server browser 110 can authenticate itself with the information source 102, facilitate the request of the information using a protocol acceptable to the information source 102 (e.g., an HTTP request for a web server), provide secure transactions with the information source 102, provide secure transactions with the client browser 112, execute embedded scripts or code segments, and resolve necessary external references (e.g., request HTML frames or script sources) to complete the information model. Preferably, the server browser 110 also includes information content caching and data pre-fetch for performance gain.

Furthermore, the server browser 110 can perform information content transformations or apply device specific style sheets to aid in presentation (e.g., display or voice) and navigation (e.g., keyboard, touch screen, or scrolling), and perform content grouping for electronic devices that accepts data in limited quantities.

To deliver these capabilities, the server browser 110 preferably contains the modules including user agent 113, cookie handler 113, QDOM 116, script executor 120, normalizer 124, serializer 128, and connectivity 132, each described below. A session manager 108 is also included to manage the session between the client browser 112 and the server browser 110. Similarly, the session manager 108 can also manage the session between the standard client browser 24 and the server browser 110.

Figure 2:
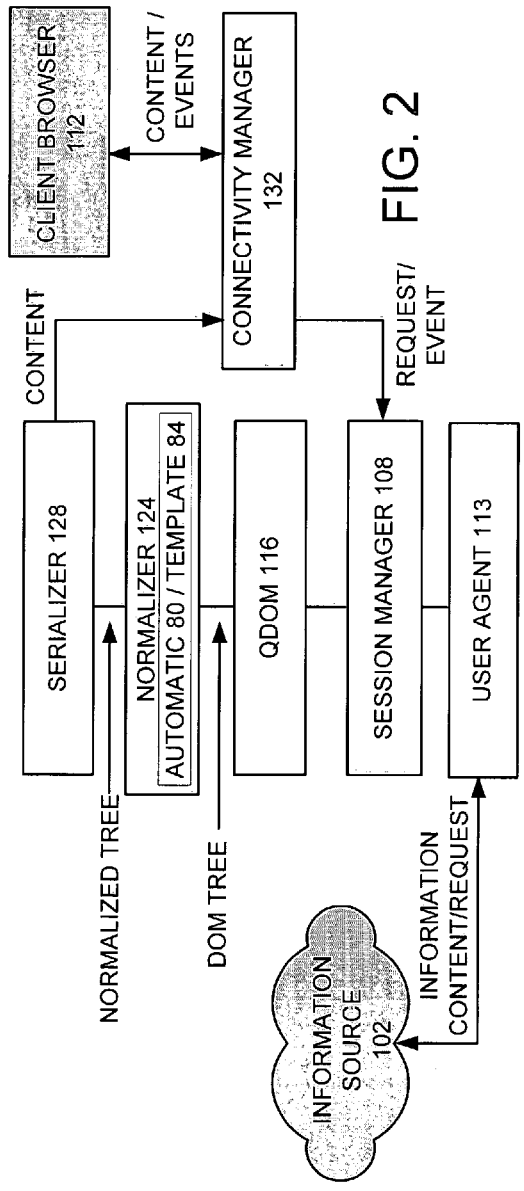
FIG. 2 is a diagram further illustrating the server browser of FIG. 1.

FIG. 2 is a diagram further illustrating the server browser of FIG. 1. The server browser utilizes a user agent 113 for accessing information at the information source 102. Preferably, the user agent 113 has the functionality of a traditional PC browser (e.g., Netscape Navigator, Internet Explorer, and so forth) as well as extended functionality, described below, due to the distributed nature of the electronic device 104. To access the appropriate information content at the information source 102, the user agent 113 communicates the requested resource identifier to the information source 102.

For example, the user agent 113 might transmit an HTTP request to a remote web server that hosts yahoo.com. According to this example, the user agent 113 would transmit a resource identifier to request a specific web page or ask the remote web server to perform a database query. The request including the resource identifier is broken into HTTP packets and the packets are sent across the Internet's TCP/IP communications infrastructure to the remote web server. The resource identifier then enables the host computer to locate the requested page at yahoo.com and return the information content to the user agent 113.

In addition to transmitting the resource identifier, the user agent 113 might inform the information source 102 of the client browser 112 type, electronic device 104 capabilities, and user preferences in the request headers and receives information identifying the properties of the data received (such as the content type, length and encoding) in the response headers. The headers that are sent back and forth between the information source 102 and the server browser 110 may also contain one or more cookies stored at the server browser 110 on behalf of the client browser 112.

Preferably, the user agent 113 conforms to the broader industry definition of the term as a component of the server browser 110 that acts on behalf of the electronic device 104 to request information from an information source 102. The requested information content can be from any information source including a web server as described above, but is not restricted to a web server. Other sources of information content might include an email server, Instant Messaging server, database or other storage of information. Additionally, the means through which the user agent 113 communicates with the information source 102 includes the HTTP protocol as described above, but of course, is not limited to that protocol.

Information content might also use XML information content and XSL style sheets instead of HTML as the preferred internet/intranet information content format. By using XML information content and an XSL style sheet, it can provide a clear separation of data and presentation. The XSL style sheet is applied to the XML information content by an XSLT engine to present the information content to an electronic device 104.

The XSL style sheet is applied to the XML information content at the information source 102, but preferably the client browser 112 can also apply the XSL style sheet to the XML information content. In this case, the server browser 110 preferably employs an XSLT engine to apply the XSL style sheet to the XML data before normalizing to produce content. One such example would be a WML client browser used to request an XML+XSL combination that produces XHTML.

Alternatively, the information content author may choose to use the original XML and apply templates and/or wireless markup instead of or in combination with XSL style sheets.

In addition to providing normalizer functionality, the system can also use templates and meta-tag markup to alter the original information content to better suit an end user application for which it was not originally designed. This can be achieved through the addition, removal or substitution of sections of content, tags and attributes (separately or together) in the markup, described more below.

Information content might also use VoiceXML (www.voicexml.org) which is an XML based language for specifying voice dialogs, including audio prompts and text-to-speech (TTS) for output and touch-tone keys (DTMF) as well as automatic speech recognition (ASR) for input. VoiceXML technology enables consolidation of voice and web applications. For example, it can be used with voice-only devices to access a voice portal, or used to facilitate multi-modal (graphical and voice) dialogs to VoiceXML enabled client browsers).

Preferably, the system (100 in FIG. 1) via the user agent 113 has the ability to read and process VoiceXML markup as well as convert from one markup (from WML for instance) to VoiceXML format. In addition, templates and/or wireless markup can be used to specify which parts of a web page are to be audible (i.e. converted to VoiceXML) and which are to be rendered visually by the browser. The server can interact with a VoiceXML gateway (much in the same way as it does with the WML gateway) to facilitate the VoiceXML based services.

Location based services might also prove to be very popular in this industry as they are well suited to mobile applications. Preferably, the server browser 110 via the user agent 113 has the ability to interact with the network entity supplying the location information via a defined protocol. The current coordinates of the electronic device accessing the network are preferably sent in the request headers to the content (web) server and/or be accessible via session cookies so that the device can easily utilize this location information. This functionality enables useful applications such as a restaurant locator that lists restaurants within a few miles of the user's current location.

Referring back to FIG. 1, the server browser 110 contains a cookie handler 115. Cookies provide a means of personalizing the information content that is retrieved by the user agent 113 on behalf of the user of the electronic device 104. Preferably, the cookie handler 115 supports session and persistent cookies. Session cookies are valid for the current user's session and persistent cookies can expire after a pre-determined time specified in the cookie or be permanent. An added benefit to server side cookie processing is that the user is provided access to his or her cookies from multiple electronic devices and the user's cookies are not lost when the user changes electronic devices.

Referring back to FIG. 2, the user agent 113 translates the requested data content, if necessary, into a recognizable markup language for further processing. The markup language may be in the format of XML, WML, HTML, or any other markup language or technology (e.g., video, audio, image) that incorporates the features used by the present embodiments.

The translated information is then organized into a logically structured format for further processing by the QDOM 116. The QDOM 116 efficiently constructs a nodal structure. The use of the QDOM 116 enables a standard structured interface to the retrieved content that can be utilized by all modules of the server browser 110. The QDOM 116 can effectively and efficiently store the information content in a standardized structure for use by the normalizer, more described below.

Referring back to FIG. 1, the server browser 110 has script executor 120 for assisting the QDOM 116 in interpreting embedded script code in the information content received from the information source 102. The script executor 120 is preferably capable of supporting the European Computer Manufactures Association standard (ECMAScript revision 3), which is most prevalent in the industry, but may also be capable of handling other scripting languages, known in the art, such as JavaScript, Jscript (Microsoft's extending implementation of ECMAScript), Visual Basic Script (VBScript), or WMLScript. The script executor 120 enables programmatic access to the QDOM 116 representation of the document.

This extension to the QDOM 116 can allow executed script code to modify the resultant document that is sent to the client browser 112, thus enabling dynamic content generation via scripting. Script executor 120 can also allow programmatic access to the cookies for a particular user, giving the content author the ability to create, modify or retrieve cookies associated with a given resource via script code. To interact with the user, communications between the script executor 120 and the client browser 112 is done via script events that are part of the application protocol between the server browser 110 and the client browser 112.

Referring again to FIG. 2, data content that has been transformed into a DOM tree is then forwarded from the QDOM 116 to the normalizer 124. Preferably, the normalizer 124 sends the DOM tree first to a template normalizer. If the template normalizer is unsuccessful at normalization, the DOM tree is then forwarded to an automatic normalizer where the data is normalized and then forwarded to the serializer 128 to be sent to the electronic device 104 via the connectivity manager 132, further described below.

The serializer 128 utilizes the normalized tree as input and produces a media stream targeted for a specific electronic device 104. Applying a style sheet or formatting rules to the DOM tree outputs a document (e.g., an XML document) that will be streamed to the electronic device 104. This document may be a complete or partial formatting of the accessed information content by the serializer 128. Preferably, the formatting rules are electronic device 104 specific and take into account display size, font types, color etc. as well as the particular markup language(s) supported by the target electronic device 104. Additionally, the serializer may dynamically format a separate media stream based on the accessed information for a second client browser. This client may utilize a markup language different from the client browser 112 of the target electronic device 104.

The server browser 110 has connectivity manager 132 for interacting with the client browser 112. Connectivity manager 132 sends and receives information to the client browser 112 using an event format and protocol such as a proprietary format (e.g., OBML, described below) and XML event messages. According to the requirements of the electronic device 104, the events may be translated via the event translator 136 (FIG. 1) to use an externally defined format and protocol such as WML and WAP.

Referring back to FIG. 1, the event translator 136 preferably provides the server browser 110 with compatibility with any standard client browser 140 or end user application that employs a known protocol such as HTTP. In this manner, the event translator 136 can receive accessed information content from the server browser and may then forward at least a portion of the accessed information content to the client browser. Current examples of standard client browsers 140 include both WAP and non-WAP based WML browsers, HTML browsers, XHTML browsers, as well as both iMode and non-iMode compact-HTML (cHTML) browsers.

Figure 3:
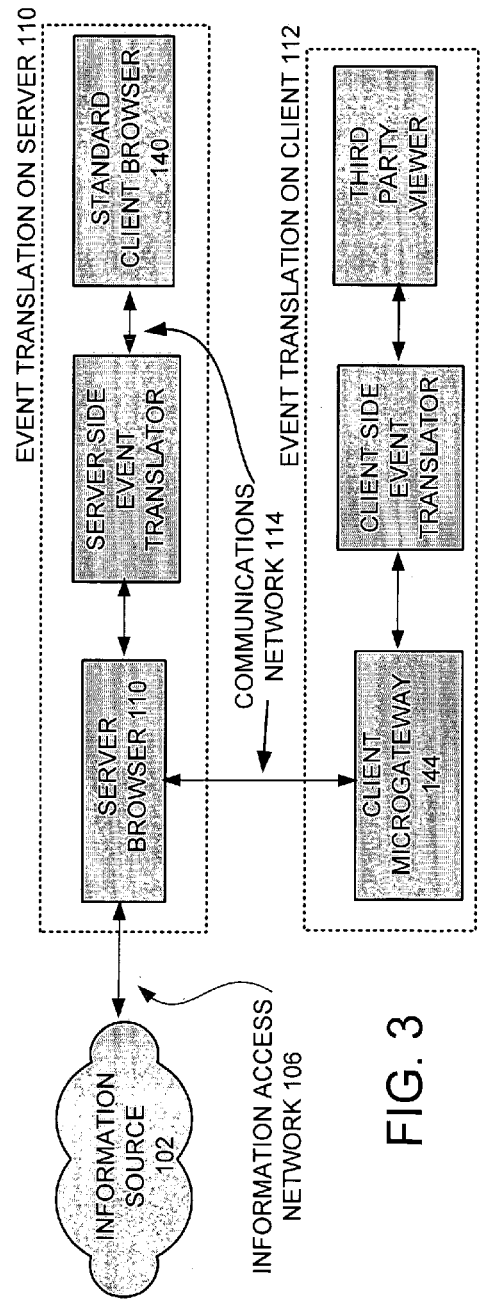
FIG. 3 is a diagram further illustrating the event translator of FIG. 1.

FIG. 3 is a diagram further illustrating exemplary uses for the event translator of FIG. 1. The event translator 136 can be utilized on the server browser 110 side or the client browser 112 side, depending on which client browser 112 or standard client browser 140 is utilized. According to the server browser 110 side, the event translator 136 operates as the interface between a standard client browser 140 and the information content data stored in a DOM format at the server browser 110. Preferably, the DOM is a QDOM 116 that identifies each node in the document using a unique value. According to the client browser 112 side, the event translator 136 can exist on the client browser 112 and provide an interface between the third party viewer and the micro-gateway 144, which also may exist on the client browser 112. One skilled in the art would appreciate that the event translator 136 is not limited to the server browser 110 side or the client browser 112 side, but can also operate between and externally to the server browser 110 and client browser 112, if so desired.

Preferably, the event translator 136 translates requests for information content to known events that can be used to generate or modify a DOM tree, dynamically assigns unique device identifiers to identify the information source 102 of standard client browser 140 events, sends events and receives responses to and from the server browser 110, and manages sessions and transactions (including timeouts, authentication, error handling etc.) Additionally, the event translator 136 may also manage the transmission of events between the server browser 110 and a second client browser.

Referring back to FIG. 1, the client browser 112 can be hosted on an electronic device 104 such as a PDA, handheld PC, mobile phone or any device with sufficient navigation and presentation capability. The client browser 112 provides the user interface for presentation or rendering of the retrieved information as well navigational capability. In addition the client browser may interact with a specific application on the electronic device 104, including an e-mail application, instant messaging application, electronic address book, bar-code device interface application, electronic calendar, and radio coverage application.

Furthermore, portions of the client browser 112 may be used by a standard or commercially available client browser. In such examples, the client browser 112 can provide distributed browser functionality that is compatible with the standard or commercially available client browser.

Moreover, the electronic device 104 is preferably validated by user/appliance ID, which can be stored within a database on a server. This ID authenticates the electronic device 104 and validates that it is allowed to access specific data content found in a particular data source.

In an exemplary embodiment, the client browser 112 can access information content via the server browser 110. Additionally, the client browser 112 preferably allows the user to submit information content or form data back to the information source 102. The form data is a response to a query posed by the data content of a particular document from the information source 102. Events containing the data for each component in the form are forwarded to the server browser 110 by the electronic device 104 where they are formatted in accordance with the content of that document by the server browser 110. The result may be an error notification (e.g. network timeout, bad data, etc.) or display of a new document received from the server browser 112 as a result of server side 112 processing of the submitted form data.

Figure 4:
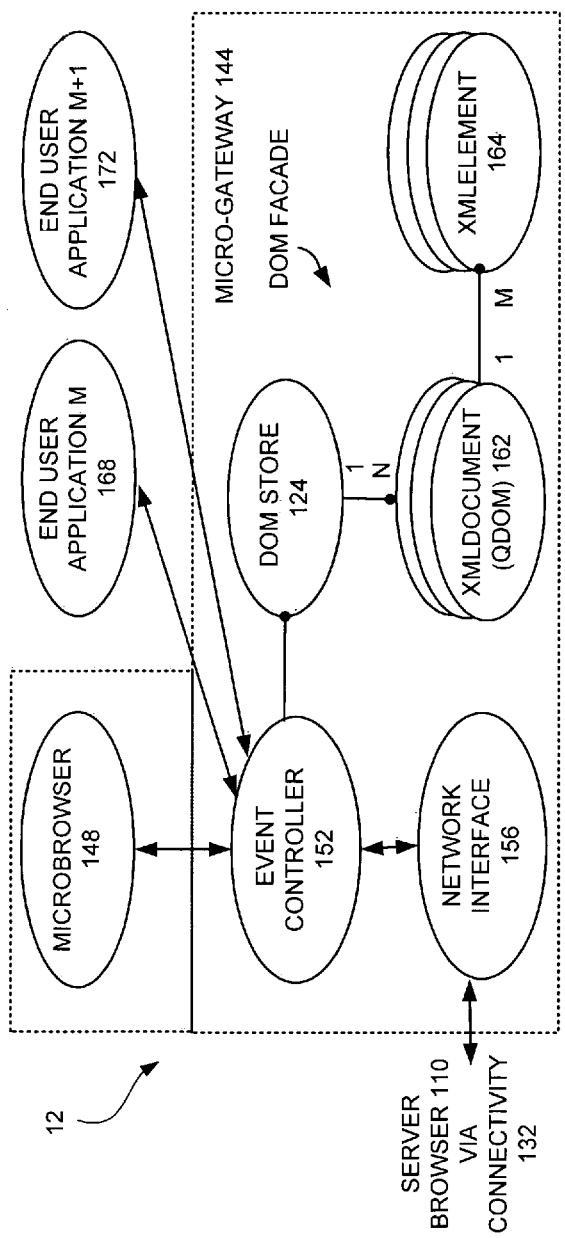
FIG. 4 is a diagram further illustrating the client browser of FIG. 1.

Referring now to FIG. 4, the client browser 112 preferably includes a microbrowser 148, event controller 152, and DOM store 124 according to the industry standard Model View Controller (MVC) representation. The microbrowser 148 is one example of an end user "View" application and represents information such as graphical or textual display, or audio to the user. The event controller 152 processes events to and from the server browser 110. The DOM store 124 is utilized for caching the information content received over the communications network 114.

The event controller 152 and the DOM store 124 operate as a micro-gateway 144 between the server browser 110 and an application 168 for interaction with the end user. In the exemplary embodiment the application 168 presents a typical browser interface allowing display and navigation of content, form interaction and submission and so forth. It should be understood, however, that the micro-gateway 144 can also support multiple different end user applications 172 on the electronic device depending on their availability and the nature and type of content data delivered to it. Examples of such end user applications include, but are not limited to, email, instant messaging, media players and other such plug-ins. Further, multiple different kinds of browsers designed for particular markup types (HTML, cHTML, WML, etc.) and so forth can also be supported by the micro-gateway 144.

In one aspect of the exemplary embodiment, the micro-gateway 144 presents an external interface to other applications 168 and 172 that consists of a well defined interface to the DOM Store 124 component and an interface to the event controller 152 using the same event model that is described below for communications internal to the distributed browser. In another embodiment, the micro-gateway 144 can be combined with the end user application 168 and 172 and use a more tightly coupled internal interface.

Additionally, the micro-gateway 144 can use an event translator (not shown in FIG. 4) to provide an interface to third party or commercially available applications such as HTML or WML or cHTML browsers. For example, according to an aspect of the present embodiment, a micro-gateway 144 and an event translator to cHTML can be used to provide an interface between the server browser component and the third party cHTML browser known as Pocket Internet Explorer on a Pocket PC device running the Microsoft Windows CE operating system.

The microbrowser 148, renders the information content transmitted to the client browser 112 by the server browser 110. In the exemplary embodiment, the rendering includes visual representations (both textual and graphical) of the markup elements, but can be extended to provide other representations (e.g., audio) according to the capabilities of the electronic device 104. The format of the representations can be fixed by particular microbrowser 148 implementations such as a WML or proprietary (e.g., OBML) browser, or can be modified according to an XSLT style defined in conjunction with the content markup.

Typically the microbrowser 148 is used to directly display markup based content received through the micro-gateway 172. In addition, the markup based content can be used to adaptively tailor the microbrowser 148 according to directives contained in the information content. Adaptations can include embedding application logic in the content presentation, modifications to the interface (menus, titles, etc.) and other configuration of the browser application or device.

It should be understood, however, that an additional property of the browser is the ability to download and install other applications or plug-ins as needed to support non-markup based content, including images, audio, video, and multipurpose internet mail extensions (MIME) or secure MIME (S/MIME) document formats such as plain text, Acrobat (e.g., "*.pdf" format), Microsoft Word and so forth. Content of these types can be viewed through the use of these other applications or plug-ins by the micro-gateway 144 or microbrowser 148, or both 144 and 148.

Preferably, the event controller 152 is an event handler. Events to and from the server browser 110 are formatted according to the particular electronic device 104 in use. In the exemplary embodiment, XML event messages and a proprietary protocol are interpreted by the event controller 152 to manage data and events to and from the server browser 110.

The DOM store 124 provides a secondary cache of the information content stored on the server browser 110. The secondary cache preferably resides on the electronic device 104 to reduce the need to pass data between the server and client browsers 110 and 112, respectively. The information content that the user desires is transmitted to the client browser 112 from the server browser 110. In the exemplary embodiment, however, once the information has been transmitted, it is stored for reuse. The information content is retained on the electronic device 104 while it is valid and while there is sufficient space to store it. The information content is stored in a DOM structure according to the W3C definition of an XML document and can be accessed by the microbrowser 148 or other applications on the client browser 112.

When the DOM is examined or modified, the event controller 152 preferably delegates the event to the DOM facade 118. These events include click, blurchange, submit, expand, etc.

In the case of a click event, the DOM facade 118 preferably examines and executes the content and/or script associated with clicking on a given node. In the case of an blurchange event, the DOM facade 118 preferably modifies the DOM so it reflects that the user has provided data. In the case of a submit event, the DOM facade 118 preferably examines the existing user input to formulate an appropriate form submission request. In the case of an expand event, the DOM facade 118 preferably delegates to a serializer to server the contents of a given folder to the client browser.

In cases where a standard browser (cHTML, WML, XHTML, etc.) is used, there is preferably no event controller. The requests from the standard browser are interpreted and translated by the event translator into events that the DOM facade 118 understands.

An "active" page is a page from the information source that is of higher than normal interest to the user of the client browser 112. It is given an active status in the cache and retained on the electronic device 14 when it otherwise might have been deleted for space or timing reasons. Where a document has been made part of the "active" cache (either through a push from the server or explicitly requested by the user through a client application such as the micro-browser), the content and any related data for that document can be accessed when the electronic device 104 is out of coverage.

Preferably, the client browser 112 handles "active" page content submissions separately and can store form data for those submissions to allow repeated attempts to submit that data until either the submission is successful or the user explicitly instructs the client browser application to delete the form data. Delivery of form submission data for the "active" content pages is guaranteed by the storage of the data in the client application browser.

Further, the client browser 112 retains the context of "active" page submissions and allows the user to access a history of chained interactions with the information source as a series of submissions of data and responses to the submissions. Note that each response can itself require a further submission and in turn generate another response, thus forming the chain. The status of an active submission in progress can also be viewed in the client browser.

The distributed browser 108 preferably utilizes send and receive events to convey information between the server and client browser 110 and 112, respectively. Events between these components can be classed as an events message, acknowledgment/negative acknowledgment (ACK/NAK) message, security handshake request/response, and decrypt ACK/NAK message.

An events message preferably carries information between the server and client browsers 110 and 112, respectively. An ACK/NAK message is used to confirm or deny receipt of an events message. A security handshake message is used to transport information used by encryption and decryption routines. A decrypt ACK/NAK is used to report success or failure in the security routines.

The first byte of the messages preferably contains an identifier that uniquely defines which type of message is contained in the data being sent. The 2-byte integral values are always "little endian" or bytes at lower addresses have lower significance.

Figure 5:
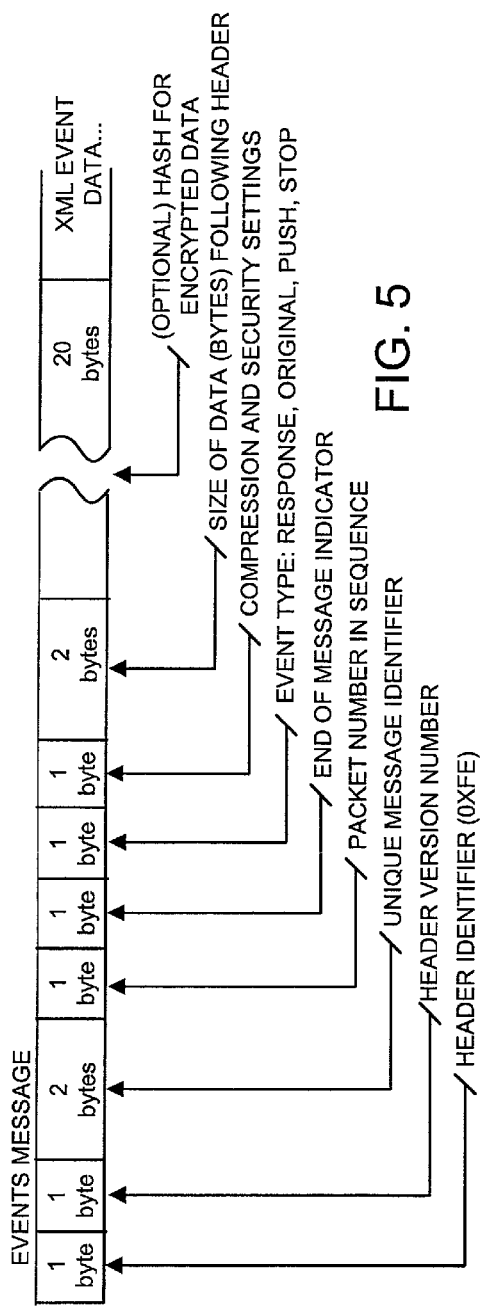
FIG. 5 is a diagram illustrating an events message utilized in the exemplary system of FIG. 1.

FIG. 5 shows the structure of an exemplary events message that is transmitted between the server browser 110 and the microbrowser 148 (i.e., via the network interface 156 and event controller 152). The event message may be modified or intercepted by the event controller 152. The event message includes header identifier, header version number, and the unique message identifier. Additionally, the event message also includes the event type such as response, original, push, or stop. Moreover, event data is included at the end of the events message.

The event data area of the events message may be compressed and/or encrypted as specified in the header component. When converted to plain text, the data area is defined as having the following exemplary structure:

```
<XML Events          = <Event Protocol Version><Event Separator>
 Message>              <Session ID><Event Separator><XML Events>
                       <EOM>
<Event Protocol      = Integer
 Version>
<Session ID>         = <Server Session ID>|
                       <Server Session ID><integer separator><Client
                       Session ID>
<Server Session ID>  = <Device Type><integer separator><Page ID>
<Device Type>        = Integer (uniquely identifying different devices)
<Page ID>            = Integer
<Client Session ID>  = Integer
<XML Events>         = <Event>|
                       <Event><Event Separator><XMLEvents>
<Event>              = <Event ID><field separator><XML Node><field
                       separator><Attributes>
<Event ID>           = integer (see table below)
<XML Node>           = Integer
<Attributes>         = <value>|
                       <value><value separator><Attributes>
<value>              = ASCII text
<EOM>                = \r\n (0x0D 0x0A)
<Event Separator>    = |
<Field separator>    = *
<Value separator>    = ^
<Integer separator>  = ,
```

All events contained within an events message belong to the same session or page of content.

When there is only a single client browser 112 on the electronic device 104, the session id information needs only to specify an identifier for the server browser 110 session or content page. When there are multiple client browsers on the electronic device 104 (e.g. multiple browser windows, browser+instant message client, or other combinations), the events message should identify which client browser 112 it is associated with.

Preferably, the page id is generated on the server browser 110. When the client browser 112 has no valid server session id to send, a zero will be sent. Zero is not used as a valid session id.

For any Uniform Resource Locator (URL) data that is contained in an events message, standard URL encoding as is known in the art, is used to ensure that the information content does not include any of the characters special to a proprietary packet format (i.e., "|", "^", and "*"). For any XML content contained in an events message, standard HTML encoding, as is known in the art, is used (e.g., where characters can be represented by "&#n;" where n is the ASCII code for that character).

The node value maps directly to a node in the DOM tree (e.g., output of the QDOM 116 in FIG. 2) and signifies the node affected by the event. For some events (e.g. load, error) the node is set to 0, indicating that there is no direct connection to a particular node. Other events (e.g. expand, onblurchange, submit, onclick) have a direct correlation to an element in the QDOM and are targeted to that element by the value set in the events message.

The following table lists the different events that can be contained within an events message:

| Event | Attribute list | Description |
|---|---|---|
| Cleaned | (none) | Notification to clients that old data has been purged so that clients can check any cached page references |
| Error | Error message | Description of an error on server |
| Expand | (none) | Client request for content of a normalizer folder |
| Expand | Document | Content of a normalizer folder |
| Load | URL, summary option, table option, JavaScript option | Client request for a new content page, including options on whether to normalize, include tables and allow JavaScript processing |
| Load | URL, summary option, table option, JavaScript option, document | Content page response or push from server, including options set in original request |
| Notify | Message data | Non-error message to client(s) |
| Onblurchange | new value for input element | The user has changed the content of an input element and moved focus away from it |
| Onclick | (none) | Click on link element |
| Reload | (none) | User wishes to force a reload of the current content page in the device application. The server will replace any existing session with a new load of the page from the web. |
| Stop | (none) | User request to stop any message identified by the MessageID in the header. |
| Submit | (none) | User has completed a form and is submitting all onblurchange data to the server |
| Authenticate | Realm | The remote HTTP server issued a challenge string requiring the user to prove possession of a valid user id and password for the realm |
| Authenticate | Authentication tokens | <username>:<password>, encoded in Base64 to be submitted back to the origin server |
| Alert | Message | Server initiated message. The device displays the alert message followed by an OK button. |
| Alert | (none) | Device returns when the user presses OK. |

-continued

| Event | Attribute list | Description |
|---|---|---|
| Confirm | Question | Server initiated message. The device displays the question followed by an OK and Cancel button. |
| Confirm | confirmation status | Device returns the button pressed. |
| Prompt | Message, default | Server initiated message. The device displays the message followed by a text input field and OK, Clear and Cancel buttons. The default message is displayed as the initial input. |
| Prompt | Button pressed, return string | If the user clicks the cancel button, return string should be null. If the user clicks the OK button, Device returns the value currently displayed in the input field. |

To conserve bandwidth over the communications network 114 between the connectivity manager 36 and the network interface 156, an events message may contain more than one event. In one exemplary embodiment, all onblurchange events are stored by the microbrowser 148 until a submit event is generated. At that point they are bundled together into a single events message for transmission to the server browser 110.

Figure 6:
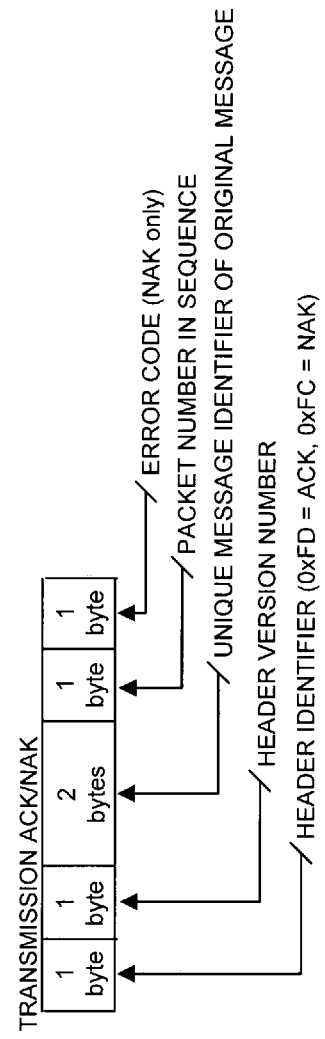
FIG. 6 is a diagram illustrating a transmission ACK/NAK message utilized in the exemplary system of FIG. 1.

FIG. 6 shows the structure of an exemplary transmission ACK/NAK message that is transmitted between the network interface (156 of FIG. 4) and connectivity (132 of FIG. 2). An ACK message is preferably used when the underlying communications network 114 does not provide message delivery confirmation to the network interface 156 and connectivity manager 132. A NAK message signifies that although an events message was received, it could not be processed (e.g. because of low memory conditions).

FIG. 7 shows the structure of an exemplary message used by the security subsystems of the connectivity manager 132 and the network interface 156. The security handshake request and security handshake response messages are used to exchange public keys between the connectivity manager 132 and network interface 156. The security ACK and NAK messages are used to signify successful decryption of events messages that have been encrypted using the shared public keys. Receipt of a security NAK message at any time or a need to encrypt the data in an events message when public keys have not been shared preferably initiate a security handshake request.

The server browser 110 includes a QDOM 116. The QDOM 116 utilizes a in-memory representation of an document tree as a single mutable object or creation of a DOM does not require creation of a language object for every node of the tree, whether that language happens to be Java or C++ or another object oriented language.

The mutability of a QDOM 116 is preferred, because transformations of the DOM tree will be applied, resulting in a new tree structure within the same QDOM Object. The architecture of a QDOM 116 allows these transformations to be performed in an efficient manner with regard to both speed and resources used.

A QDOM 116 consists of an aggregation of N re-usable buffers that contain arrays of raw bytes. As the QDOM grows, additional re-usable buffers are added, only as needed. Some of the re-usable buffers contain binary information describing the DOM tree structure, tree dependencies, and references to information content data. Other buffers contain the actual content data.

Figure 8:
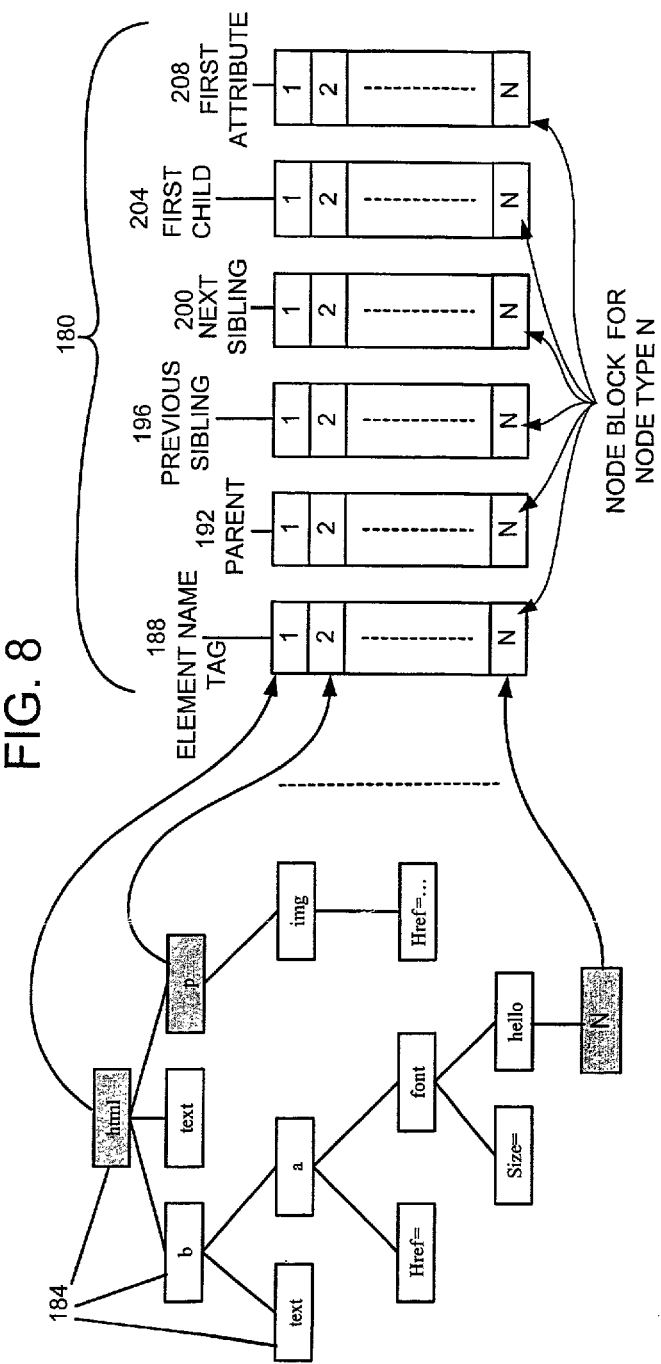
FIG. 8 is a diagram illustrating an exemplary process of the QDOM of FIG. 1.

FIG. 8 shows one exemplary embodiment in which separate QDOM 116 arrays 180 are used for the values representing the following properties of each element node 184: element name tag 188, parent node 192, previous element sibling 196, next element sibling 200, first child element 204, and first attribute 208. Similarly, each attribute node can be described with the following properties including attribute name tag, attribute value tag, previous attribute sibling, and next attribute sibling. Separate arrays can be stored in the QDOM 116 for attribute data, or it can be overlaid in the same arrays used for element data.

In another exemplary embodiment, the same information can be stored in structures for each node and attribute. The QDOM 116 contains one or more arrays of each of these structures. The choice of the means of storage depends on the functionality of the programming language employed for the QDOM.

The actual string names of the tags and attributes of tree elements are replaced by a corresponding value equivalent. A dictionary of the strings and their corresponding value is preferably built up as necessary to deal with a particular set of XML tags. For performance reasons, pre-compiled dictionaries can be used for the well-known markup languages, such as HTML or WML.

Figure 9:
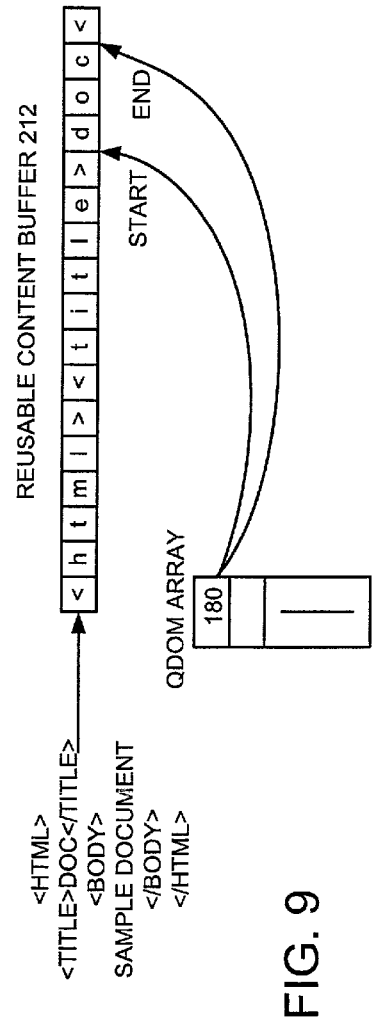
FIG. 9 is a diagram further illustrating the process of the QDOM of FIG. 8.

FIG. 9 shows a re-usable content buffer 212 that the QDOM array 180 references when information content that is not well known (such as plain text data) is used. The QDOM array 180 preferably stores the start and end positions of the text in the content buffer 212. In another exemplary embodiment, the content buffer 212 stores zero terminated strings and the QDOM array 180 stores the start position.

Preferably, the interface to the QDOM 116 is value based because every node (for example, see 184 in FIG. 8) of the tree has a unique value associated with it. All operations on the nodes in the tree that the interface provides can be carried out using that value as a reference to the affected nodes. All comparisons between nodes are also value based, so expensive string comparisons can be avoided.

Since the underlying structure of the QDOM 116 groups of raw bytes, it can easily and efficiently be serialized to and from permanent storage, thus reducing the amount of random access memory (RAM) memory necessary to support multiple users and multiple documents per user.

In situations where resources are limited, such as on a PDA, the QDOM 116 structure in the form of DOM store, XMLDocument, and XMLelement (124, 162, and 164 in FIG. 4 respectfully) can also be used efficiently by the client browser 112. The QDOM storage is divided into smaller groups that are held in a permanent storage area (e.g., FLASH). Only such groups as are needed for the current operations on the QDOM are retained in or moved to a fast memory area (e.g. RAM). This provides high performance through an efficient use of the data in RAM while still minimizing the actual resource load in use at any one time.

A QDOM 116 is implemented as a re-usable object, so rather than deleting it and having a "garbage collector" reclaim a space occupied by the document, the QDOM 116 can be easily and efficiently re-initialized and used to store some other XML Document.

A number of preliminary tests have been taken to determine the time saved using the QDOM 116 as compared to the node-based interface of the standard W3C DOM. The tests show more than 100× improvement over other W3C compliant models.

The normalizer organizes the DOM tree into tiers or folders under headings that contain related content. The result is a set of hierarchical DOM node collections. The characteristics of font, font size, font color, hue saturation comparison of background and foreground color and Cascading Style Sheet or XSLT properties are used to determine the weight of a text node. The weight is then used to determine whether it will be inserted into a normalized document tree as a parent or child. The parent nodes become folder titles and the child nodes become the folder contents. Thus, higher weight document objects are pushed to the top of the tree so the user can decide whether to "walk" down the branch or not.

The normalizer dynamically streamlines and folderized the content automatically or via predefined additional rules to achieve automatically an experience similar to reading a newspaper. The normalizer including the template normalizer and meta-tags allow the content source to be redefined once for all networks and device types. The alternative technologies in the industry are large cycle time, re-development of the content, often specific to one or more of the following: each device ergonomics, or a particular client-only browser, or a particular network type.

The goal to normalizing is to adapt desktop focus web content to handheld browsers. This requires filtering unsupported content, dropping unneeded content, reordering and partitioning content to improve navigation and application flow for display on a limited device. Some of the functions to normalization are folderize/partition content, drop content not required on a handheld device, reorder content, provide prompts/names to input elements The normalization process can utilize a weighted heuristic and pattern recognition to create a the contextual relationship of with nodes in the source tree. The output from the normalization process is a hierarchical content tree. Preferably, the normalized tree is not specific to a particular presentation language. Therefore it can be transcoded for display by any type of client browser.

Content collapsing rules in the automatic normalizer utilize the previous page loaded to determine if similar constructs exist in a page which can be collapsed into folders or selectable input elements on subsequent loads. This is performed by comparing the previous page loaded with the current page. The trees of the documents are compared to determine if similar fragments (list of links, table, image) exist. The similar fragments of the tree are collapsed into folders or select input elements. The effect is to conserve display space on the device.

Electronic devices can have limited display characteristics such as display size, font types, color etc. Most web content is tailored for display on desktop browsers which not only suppose a large screen, but also support a rich set of fonts, colors, and formatting constructs such as tables and frames. The normalizer adapts existing information content for display on the electronic device 104. The normalizer 124 includes an automatic normalizer 80 and template normalizer 84.

Referring back to FIG. 2, the automatic normalizer 80 in the normalizer 124 maintains the context of the information content before taking the electronic device 104 specifics into account. The automatic normalization process does this by organizing the information content into folders. The result of this approach is that sets of nested folders are created which the user can "walk" the information content on the electronic device 104. The titles of the folders are sent to the electronic device 104 first and the user can determine if the contents of particular folders are of interest. This not only increases usability in terms of reduced content to scroll through for the user and time spent scrolling through the page, it also optimizes wireless bandwidth utilization because less data is sent to the electronic device 104.

It should be noted that while the exemplary embodiments of the normalizer processes concentrate on the normalization of HTML content, including that generated by scripting technologies such as JavaScript, these same processes can be applied to other markup content. It is well suited to any XML content.

The automatic normalization process traverses a DOM tree from the QDOM 116 40 and creates a new, normalized tree. Preferably, the original DOM is transformed rather than copied, so that it becomes the normalized tree itself. This provides both efficient performance and efficient memory utilization.

The normalization process begins with the root node of the document and traverses the tree along a depth first path to maintain context at all times.

If a node is the beginning of a table, a table pattern recognition process is preferably executed. The entire table is weighted and pattern recognition criteria are compared to determine if the table matches a defined pattern. The table recognition criteria define a profile for different data table types. Each cell in the criteria is defined to be either greater than, less than or equal to a root table weight, a "don't care" or defined to contain certain nodes such as anchors or images. The root table weight can be derived from any cell in the table such as the cell at position row 0, column 0 or can be derived outside the context of the table. These criteria define the pattern that is attempting to be matched. If a pattern is recognized, the table cells are formatted corresponding to that pattern. If a pattern cannot be recognized, the weighted node processing continues.

The major part of the weighted node process is the maintenance of a weighted node stack. The first element of that stack is always the "DOCUMENT" itself, having by default the highest possible weight. The normalization process takes the next node from the DOM tree. The node is first filtered to determine if it has an effect on weighting or presentation. If the node is not significant it is preferably dropped. Nodes such as the HTML tag in HTML are not significant since the tag has no effect on presentation. Next it is determined whether the node is a weighting node or a content node. Weighting nodes are nodes that affect the display of rendered content such as a bold or heading format tag. Some weighted tags may have a negative weight that allows nesting of the tags and emulates a hierarchy of nodes weights such as nested list items. Content nodes are nodes such as text nodes, input nodes, and image nodes.

When a weighted node is encountered, the node weight is added to the accumulated weight. When a content node is encountered it is assigned the accumulated weight and becomes a weighted node. The weighted node finds its position on the weighted node stack by finding the lightest element on the stack with a weight greater than his (node's parent). Stack nodes from that point on are preferably deleted from the stack. The new weighted node becomes a child node for that parent. When the node goes out of scope (e.g. if a TABLE is ended), the normalization process checks the weighted node stack to remove all nodes that belonged to the expired scope of influence.

For example, if the node on the weighted node stack is part of a table and the table scope of influence has expired, then that node is removed from the weighted node stack. However, if that node belongs to more than one scope of influence (e.g. it is part of one table nested inside another table), all scopes of influences are checked against that node and it is removed preferably when they are all expired. When the inner table ends, node stays until it replaced by a heavier node or the outer table ends.

The template normalizer 84 is a tool for recognizing patterns within a document through a DOM tree and applying changes to those patterns as specified in the template syntax. Preferably the template normalizer 84 is part of a larger process of normalizing all documents. One step of the larger process is an attempt to match and apply templates where possible.

The template normalizer 84 preferably handles numerous variations of the same document as dictated by the application logic that produces it. For example, if a certain data table could have various numbers of columns and rows, or even not be present in the document at all, the template normalizer 84 is preferably still capable of dealing with those variations.

The template normalizer 84 is capable of recognizing an document from a set of potential documents that could be produced by the application. For example, if the application produces two completely different documents depending on whether a user is logged on or not, a single template could still recognize the outcome and apply its changes to either one.

The template normalizer 84 is also capable of recognizing a change in the overall structure of the document to determine when its rules are not applicable any longer. In that case, it will not attempt to apply the changes, but will convey the document to an automatic normalizer 80.

The template normalizer 84 uses a regular expression pattern-matching machine as applicable to DOM trees. The syntax of a template is strict XML as described by the World Wide Web Consortium (wvw.w3c.org) and includes a number of proprietary regular expression tags and attributes that describe how the template normalizer 84 should match and modify original content.

Tags:

| | |
|---|---|
| <xgrp> | equivalent to a bracket in Regular Expressions |
| <xany> | equivalent to a wild card in Regular expressions |
| <xalt> | equivalent to 'or' in Regular expressions |
| <xadd> | signifies the addition of contained markup |
| <xnone> | equivalent to "empty" in Regular Expressions |

Attributes:

| | |
|---|---|
| "xtimes" | the number of times to apply a recurring pattern |
| "xtitle" | specifies a new title for a matched pattern |
| "xid" | specifies a name of an XML node |
| "xparent" | re-parent an XML node to a specified element |
| "xdrop" | delete a node from the tree |
| "xformat" | produce a formatting attribute for an input field |
| "xaction" | apply a user-specified algorithm to the branch of a tree |

The normalization process preferably scans a dictionary of templates and an initial comparison is made based on a URL specified for the template and the URL of a document to be processed. If the URLs match, then the template normalization process begins.

The template normalizer 84 deals with a document or XML document in two steps: first it uses the regular expression pattern-matching machine to impose itself over a document and attempts to match the template to the document content. The match is performed using the regular expression tags in the template to apply standard regular expression algorithms. If that process fails, the changes specified by the template are not applied, and the document is conveyed to the automatic normalizer 80.

If the match process succeeds, the template normalizer 84 will apply changes as specified by the attributes of the matched regular expression elements. Changes include dropping nodes, creation of new folders or tiers, re-parenting nodes, assigning new titles to nodes, etc.

During the application of the changes, the template normalizer 84 can use a complex state variable syntax to refer to the parts of the document. These variables can be set as pointers to nodes in the DOM or counters. Resolution of a variable expression starts with the inner most expression and is processed outward. This is similar to list processing in the LISP programming language. The inner resolutions are used to resolve subsequent resolutions.

Where a counter is used in a variable expression, the variable will be resolved using the current value of the counter.

Resolution Example:
If $z=a and $ya="data" the expression $(y($z)) would be resolved to $(y$(z))=$ya="data".
$z gets resolved to a and this creates the expression $ya which is then resolved to "data".

Counter Example:
If xcounter="x" and the first iteration of an Xgrp is occurring, then the expression $a($x) will be resolved to $a1.

If a variable is used in the context of an Xtitle attribute, the value for the variable is derived from the text value of the DOM node that is referenced by the variable.

If the variable is used in the context of an xparent, then the variable is resolved to a DOM node to which to move the referring node as a child.

The xid attribute is used to set the value of a variable to the DOM node.

Template normalization involves matching a template DOM tree with an input DOM tree and applying changes to the input DOM tree. The automatic normalization algorithms may be called during the apply step of template normalization where specified by the xaction attribute.

With integration of the automatic normalization algorithms, a template can be utilized to drop and reorder content while calling the automatic normalization algorithms to partition the content into a hierarchical set of folders.

Figure 11:
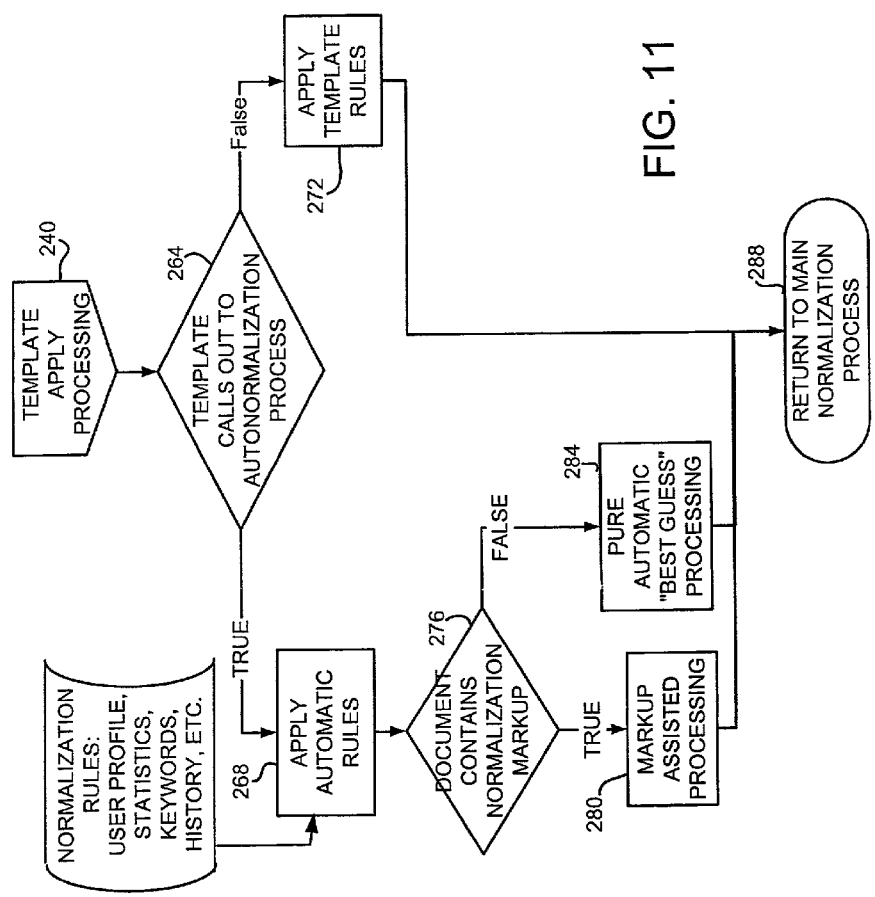
FIG. 11 is a diagram further illustrating the process of FIG. 10.

FIGS. 10 and 11 illustrate the flow of logic in the exemplary embodiment for determining when to apply the automatic, markup assisted or template normalizer 84 algorithms. It should be noted, however, that the process is not restricted to the current flow, but can include variations such as the application of the automatic normalizer before the application of the template normalizer.

At step 220, a DOM tree is preferably obtained from the QDOM and input into the normalizer.

At step 224, the normalizer determines if a template exists for the DOM tree of the document. If the template does not exist, the DOM tree is forwarded to the automatic normalizer for processing per step 232. If a template does exist, the DOM tree is forwarded to the template normalizer for processing per step 228.

At step 228, the template normalizer determines if the existing template matches the DOM tree per step 236. If the template does not match per step 236, the DOM tree is forwarded to the automatic normalizer for processing per step 232. If the template does match the DOM tree per step 236, the DOM tree is forwarded to the template application process per step 240 (and expanded in FIG. 110).

At step 244, if the template apply process fails, then the DOM tree is forwarded to the automatic normalizer per step 232. If the template apply process is successful, then the DOM tree has been normalized into a normalized tree.

At step 248, the normalized tree is forwarded to the serializer for transmission to the electronic device via the connectivity manager.

At step 232, the automatic normalizer is applied.

At step 252, it is determined if the DOM tree has normalization markup or meta-tags. If the document does not have normalization markup or meta-tags, the DOM tree is forwarded to step 260. If the document does have normalization markup or meta-tags, the DOM tree is forwarded to the markup assisted processing per step 256.

At step 256, the normalization markup or meta-tags are utilized to assist in normalizing the DOM tree into a normalized tree. The normalization markup can provide instruction to the automatic normalizer to create the normalized tree. The normalized tree is forwarded on to the serializer per step 248.

At step 260, the DOM tree is normalized using a "best guess" processing. After step 260, the DOM tree is normalized into a normalized tree and forward on to the serializer per step 248.

According to FIG. 11, the template apply process per step 240 is further illustrated.

At step 264, the template apply process determines to use the automatic normalizer process per step 268 or the template rules process per step 272. If the template apply process determines to use the automatic normalizer rules, the DOM tree is forwarded to step 268. If the template apply process determines to use the template rules, the DOM tree is forwarded to the apply the template rules per step 272. If the template rules are applied per step 272, the DOM tree has been successfully normalized and returns to the normalization process per step 288.

At step 268, the normalization rules such as user profile, statistics, keywords, history, are applied and the DOM tree is forwarded to step 276 to determine if the document contains normalization markup. If the document does not contain normalization markup, the DOM tree is forwarded to markup assisted processing per step 280. If the document contains normalization markup, the DOM tree is forwarded to the "best guessing" processing for applying pattern recognition and weighting heuristics to the DOM tree and forwarded to the normalization process per step 288.

Some devices (e.g. those with small screens) do not support the display of tables as in a traditional desktop browser. The problem is determining how to extract content from the table into a linear form so that it is presentable on the device. Table pattern recognition looks for tables that conform to some of the more common uses of the tables for data presentation. A weighting and comparison of table cell nodes in the DOM tree against each other is used to determine the order in which to extract cell data from the DOM tree. The comparison of weights attempts to determine if the nodes match a recognized table pattern. Cell weights are assigned in the same manner as the general normalization process, but other characteristics are also compared. 'Other characteristics' preferably includes the type of cell element (table heading or table data) and if the table cell contains an anchor or an image, but may extend to any particular attribute of the cell data.

Figure 12:
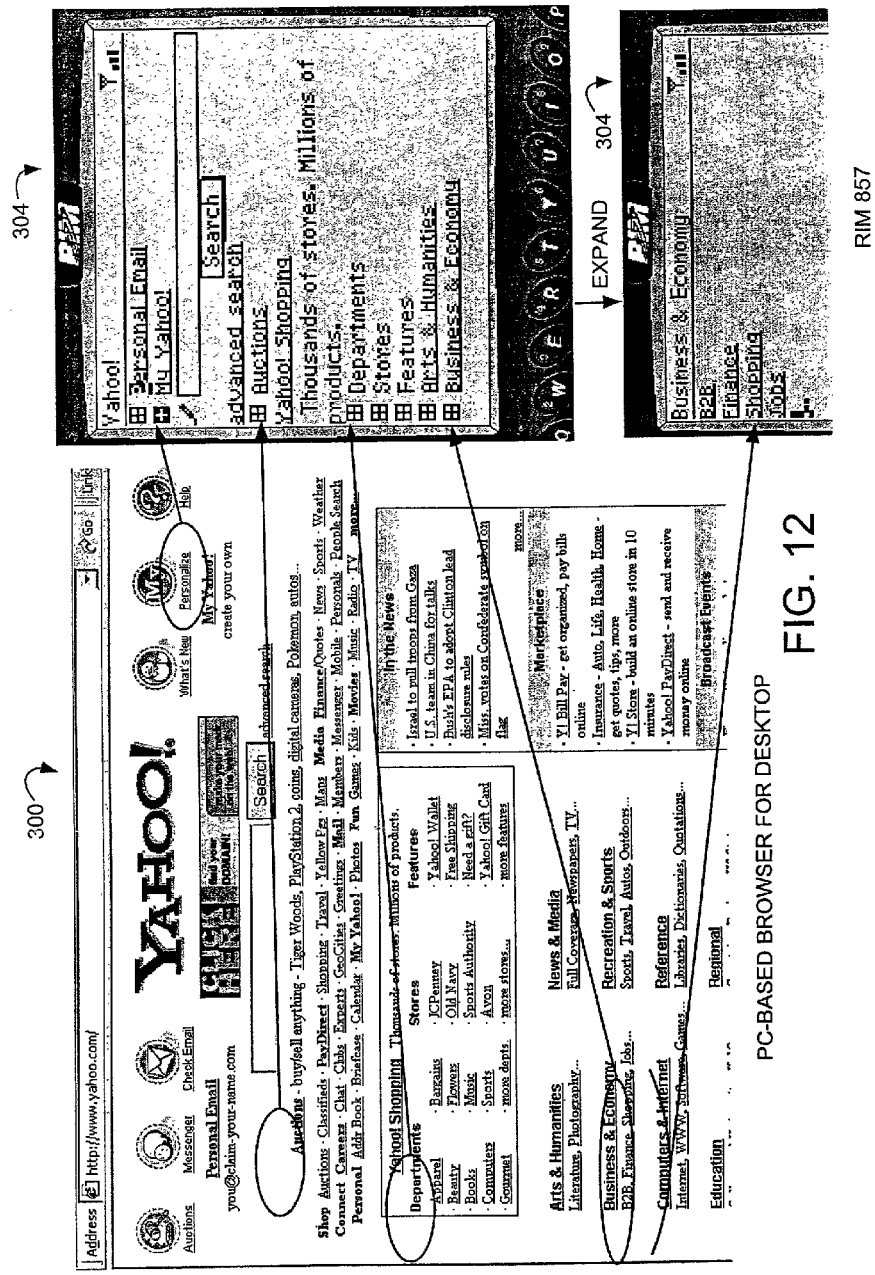
FIG. 12 is a diagram showing an exemplary conversion of output from the system of FIG. 1.

FIG. 12 shows an example Table Pattern as formatted in the original content for a wide screen display (desktop) and reformatted for a small screen device. In this table the first row of table cells contain heavy weight text nodes. These nodes will become headings/parents for the columns. The following rows will become children of the parent nodes as shown in the small screen display result.

The general normalization rules may not apply to all web sites. Therefore it may be possible to specify specific rules on a URL basis. Preferably, URLs can be matched exactly or partially, such as in the matching of the domain name component only.

The concept behind adaptive browsing is that most users hit certain links or objects in a document more than others. The user's statistics can be used to increase the priority/weight of an object in the tree in order that the user be displayed that object first. This allows the page to be adapted to the user's tendency/habits. This mechanism will aide in browsing efficiency for the user. Content nodes will accumulate more weight based on the statistics on, for example, the click count on an anchor.

A User can provide keywords for his profile that can be used to assign weights to the document content. Content matching any keywords would be pushed to the top of the tree by assigning higher weights to the matched elements.

Markup assisted normalization defines a wireless specific markup that conforms to HTML 3.2 and 4.0 specifications and does not affect the page for display by other HTML browsers.

The markup defines a set of attributes that can be introduced to existing HTML content. These attributes are triggers for the automatic normalization process to perform certain operations such as move content or create a folder.

TAGS:

HTML <meta> tag-<meta wireless:ml="true|false">

If a meta tag exists in the <head> of the HTML page with the wireless:ml attribute set to true, the automatic normalizer will be triggered to perform markup based normalization.

HTML <div> Tag

A div tag with wireless attributes is used to encompass blocks of HTML which will be processed by the automatic normalizer. The wireless attributes assigned to the div tag will not affect display of the content on HTML desktop browsers.

The markup is extensible in that other attributes may be added in the future to trigger other automatic normalization behavior such as wireless specific javascript.

HTML <style> Tag

The style tag is used to encompass arbitrary blocks of HTML that will only be processed by the automatic normalizer. Preferably, the content encompassed by the style tag will not be displayed on HTML desktop browsers.

Attributes:
<div> attributes
    wireless:action: (default behaviour = autonormalize)

| | |
|---|---|
| | drop the content encompassed by the div from the wireless content |
| colbycoltable-normalizer | call a formatter on a table which extracts the data column by column |
| rowbyrowtable-normalizer | call a formatter on a table which extracts the data row by row |
| Folder | create a folder with a given title which will contain the encompassed content |
| Mark | mark a place in the content with an id |
| Move | move the encompassed content to marked position or folder |
| Include | include a block of html defined in a style block |
| Autonormalize | call the automatic normalizer on the encompassed content |
| Passthru | pass the content encompassed by the div to the handheld as is | wireless:id:
        sets an identification string for the folder, mark, move or include action.

-continued

```
wireless:title:
    used to name a folder.
wireless:href:
    used in conjunction with the menu action and the folder action
    to define an anchor/href link in the wireless page
<style> attributes
    wireless:id:
        an identification string for the block of html which can be
        included into the wireless page.
```

For example:

```
<html>
    <head>
        <meta wireless:ml="true"/>
            <style wireless:id="html block">
            block of html which can be included in the wireless page
            </style>
    </head>
    <body>
        <div wireless:action="include" wireless:id="html block">
        </div>
    </body>
</html>
```

Referring back to FIG. 1, the distributed browser 108 preferably appears to the information source 102 as a client interface, such as a PC that is browsing an Intranet or Internet. However, when the server browser 110 receives the information content plus script code, it can create an XML based Document Object Model ("DOM") tree structure. This structure can organize the information content into a structured format that is interpreted and processed by the normalizer to organize the information content into folders or tiers. After the information content is in a structured format, the server browser 110 can forward the structured format to the client browser 112 hosted on the target electronic device 104.

Furthermore, information content can be transmitted from the server browser 110 to the client browser 112 without first receiving a request from the client browser 112. Therefore, information content such as in channels of desirable content like sports, weather, and stocks can be forwarded to the server browser 110 at periodic intervals. Additionally, the information content sent to the client browser 112 can include a note. Such a note could inform the user of the client browser 112 that additional information content is stored at the information source 102 or server browser 110, or both.

In any markup language (e.g. WML, HTML, cHTML, XHTML, etc.) the source content contains two distinct types of information—information that is visible to the user and information that carries processing instructions to the browser or viewer (e.g. a URI for new content to load when an element is selected, rules governing how to submit form data to the content source, etc.). The latter type of information, while not visible to the user, often occupies more than 50% of the total source HTML code.

Through the use of Object Based Markup Language (OBML), a proprietary markup language, an object aware distributed browser can take advantage of this distinction of information to leave the majority of the processing information on the server side and only send the end user visible information to the client browser. Under this scheme, the client version of the DOM will thus represent a functionally equivalent, but stripped-down version of the original DOM, allowing for efficiency in both content transmission to the device and event handling between the server and client components.

In order to support this scheme, every node in the original server side DOM is assigned a unique number. Every DOM node that has a processing instruction associated with it (e.g. in HTML this could be a link to follow when it is clicked), a "P pointer" attribute for that node is sent down to the client browser. Since it is unique, the P pointer can identify the element back to the server.

For example:

A DOM on the server side contains the following anchor information at node 1234
<a href="/hockey/nhl/2001/playoffs/news/2001/04/15/kings_red.wings_ap/?s=4">Kings beat Wings 2-1, end 14-game playoff skid</a>

When formatted in OBML, this node is represented as
<a p="1245">Kings beat Wings 2-1, end 14-game playoff skid</a>

This represents a significant savings on the amount of data that needs to be sent to the client over a network (e.g., wireless network). An event back to the server indicating that the anchor has been clicked on/selected need only carry the value of the P pointer. Note that a P pointer can also be used to identify the elements for other control events such as an input field or form submission button.

Similarly, OBML provides support for the folders that are the output of the normalizer through the use of an "x" pointer attribute. The presence of this X pointer indicates to an object aware browser that an element is an object representing a group of child elements and that those children can be requested from the server.

For example:

If the anchor shown above was identified as a folder title by the normalizer, it would be represented in OBML as
<a p="1234" x="1234">Kings beat Wings 2-1, end 14-game playoff skid</a>

As with the use of the P pointer, events between the browser components requesting or delivering the content for expansion of the folder identify the element using the X pointer value only.

Note that an element can have a P pointer alone, an X pointer alone or both attributes together.

In the exemplary embodiment, the event translator can provide an interface to a WAP gateway and translates events in the following manner, an HTTP GET request for a URL of the format p+digits where digits is a number. (e.g. p174) is translated to an "onclick" event targeted at DOM node 174, an HTTP GET request for a URL of the format x+digits where digits is a number. (e.g. x174) is translated to an "expand" event targeted at DOM node 174, an HTTP POST request for a URL of the format s+digits where digits is a number. (e.g. s174) is translated to a "submit" event targeted at DOM node 174, an HTTP POST request containing postdata name value pairs in the format n+digits=somevalue (e.g. n323=foo) is translated to an "onblurchange" event targeted at DOM node 323 with value "foo".

An HTTP POST request containing postdata name value pairs in the format somename=n+digits (e.g. myName=n323) is translated to an "onblurchange" event targeted at DOM node 323 with value "1".

In another embodiment, XML documents or other documents may also originate from the electronic device 104. For example, a user may scan a product bar code with a electronic device 104 to produce a document with a client application on the electronic device 104, and send the document via the gateway cluster 18 to an e-commerce transaction server for processing.

FIG. 12 further illustrates the process of the distributed browser 108 of FIG. 1 by showing a screen shot 300 of an exemplary web page (www.yahoo.com) on both a standard PC-based desktop browser (e.g., Microsoft's Internet Explorer) and a screen shot 304 on the RIM 857 electronic device. To view the yahoo.com web page on a PC-based desktop browser, a user might use a mouse and/or keyboard to enter the Universal Resource Locator (URL) that identifies the page.

The same user can enter the URL in the RIM device to retrieve the same information as shown on the screen shot 300. However, the screen size of the RIM device is smaller than that of a typical computer screen of a desktop computer. To accommodate the RIM screen size, the information is displayed such that the important information is displayed first. In this example, Personal email, Departments, Stores, Features, Arts & Humanities, Business & Economy are displayed first. The user can then appropriately navigate through the rest of the Web site using events such as by clicking, loading, changing, etc. In this example, the Business & Economy folder was expanded to the more information relating to the Business & Economy section, described more below.

Upon receipt of the event from the RIM device, the server browser proceeds to perform the request. The user agent retrieves the information corresponding with the URL and appropriately forwards the bit stream to the QDOM. The QDOM then utilizes the QDOM to transform the data content into a DOM tree and forwards this tree to the normalizer. The normalizer (automatic, markup assisted and/or template) creates folders of content, typically by utilizing the characteristics of font, font size, and font color to determine the weight of a text node. In general, the titles of the folders are sent to the electronic device 304 first. In some instances, however, folder content can be sent down to the electronic device with the folder titles. This can occur based on a request by the user or through a determination by the serializer that the content is sufficiently small to be sent in the initial load.

In this example, the automatic normalizer identifies elements that are of higher importance or visibility on the desktop display and uses them as folder titles. Elements identified by the normalizer are bold font items (e.g. "My Yahoo!" and "Auctions"), table headings (e.g. "Departments") and larger font items (e.g. "Business & Economy"). A folder title can be derived from both ordinary text (e.g. "Departments") or hyperlinks (e.g. "Business & Economy"). In the latter case, the link property is preserved on the device.

For example, assume the user has selected "Business & Economy" and requested an expansion of the folder. The electronic device 304 may already contain the content for this folder cached in the micro-gateway (FIG. 4), in which case it can display it immediately as shown. If the content is not cached on the electronic device 304, however, a request is sent to the session manager where the entire DOM is cached. The content of the folder being expanded is extracted by the serializer and sent to the electronic device where it can then be displayed. It should be noted that the normalizer is not restricted to a single level of folders but will produce an appropriate level of nested folders depending on the nature of the original content.

In accordance with the present embodiments, the server browser interacts with the network content and performs the primary functions unique to this architecture such as automatic translations, object based browsing, and object based personalization. In addition, the architecture uses XML as the protocol to exchange information between the various systems. Furthermore, the media managers can support instant messaging capabilities between desktop browsers and multiple electronic devices. Thus, the data is appropriately sent to the electronic device. Furthermore, the user is allowed to navigate through the Web site.

The normalizer also reduces the data content sent to the device by allowing the user to browse only the content of interest. It can achieve this by partitioning the web page content into expandable objects. The partitioning of content is achieved by a normalization process in which normalization rules are applied to the markup language tags, such as HTML tags. This feature enables the user to essentially walk a document tree and only query for content of interest.

Some tables which are small enough for an appliance may be sent directly to the appliance. These simple tables can be displayed as a table directly on the screen of the appliance. The default normalization for a table extracts the content of the table into an expandable object-based structure. Simple data type tables should be displayed on the device using a table control. Tables used for displaying for formatting or complex data (nested information, multiple fonts, mixed information such as text combined with links in the one cell, etc.) are not required. Limited support for merged cells in heading rows is required.

Additionally, a user may wish to see the entire contents of a Web site without utilizing the expandable object architecture. Therefore, the user can support a "Load All" of a Web site, which can result in the full content tree of the Web site being sent to the device. In this mode, there will be no expandable objects, however the normalization can utilize white-space horizontal tabs to display the parent-child relationship.

The server browser can have a minimum character threshold used to determine if the children under a parent are small enough to send on a load. The server browser preferably has a maximum children threshold used to determine if the number of children under a parent is small enough to send on a load. If the maximum character threshold is not exceeded and the maximum children threshold is not exceeded, the children will be sent in the load. The server browser preferably has an inline threshold expansion parameter in which horizontal tabs will be used to show the parent-child relationship rather than expandable objects.

In addition, the user can utilize a find function on the electronic device. The find function can send a request to the server browser for a find to be performed on the page with a user input string. Options for loading a page and their effect on the content is specified in the following table.

|  | Threshold Exceeded | Threshold Not Exceeded/Threshold Inline On | Threshold Not Exceeded/Threshold Inline Off |
|---|---|---|---|
| Load All/ No Tables | Thresholding has no effect. All content will be sent formatted inline. | Thresholding has no effect. All content will be sent formatted inline. | Thresholding has no effect. All content will be sent formatted inline. |

-continued

|  | Threshold Exceeded | Threshold Not Exceeded/Threshold Inline On | Threshold Not Exceeded/Threshold Inline Off |
|---|---|---|---|
| Load Summary/ No Tables | Normalized content will be sent formatted as expandable objects. | Children under the threshold will be sent formatted inline. | Children under the threshold will be sent formatted as expandable objects. |
| Load All/ with Tables | Thresholding has no effect. All content will be sent formatted Inline except for tables. | Thresholding has no effect. All content will be sent formatted Inline except for tables. | Thresholding has no effect. All content will be sent formatted Inline except for tables. |
| Load Summary/ with Tables | Normalized content will be sent formatted as expandable objects, except for tables. | Children under the threshold will be sent formatted Inline. Tables will be sent as is. | Children under the threshold will be sent formatted as expandable objects. Tables will be sent as is. |

The server browser preferably employs methods to partition content based on user profile characteristics. These characteristics could be keywords or usage statistics. The data content sent to the electronic device may need to be adapted to a specific markup language or device dependent requirements (e.g. display size, color capability etc). The protocol and data content sent to the electronic device is preferably compressed and optimized to reduce bandwidth usage and cost to the user.

User authentication and secure communication is preferred by certain web sites for private end-to-end communication (from the Internet to the electronic device). This secure communication and authentication is accomplished by many mechanisms such as, SSL and HTTP Authentication. HTTP Basic Access Authentication scheme is a method of user authentication, by passing a user name and password back to a web server. Basic Authentication does not encrypt the username and password back to the web server.

The server browser preferably supports HTTP 1.1 Basic Access Authentication. The Device shall have the ability to allow the user to enter the username and password for authentication. The SSL Protocol preferably provides privacy and reliability between at least two electronic devices. The protocol is composed of two layers. At the lowest level, layered on top of some reliable transport protocol (e.g., TCP, is the SSL Record Protocol.

The SSL Record Protocol can be used for encapsulation of various higher level protocols. One such encapsulated protocol, the SSL Handshake Protocol, allows the server and client to authenticate each other and to negotiate an encryption algorithm and cryptographic keys before the application protocol transmits or receives its first byte of data. One advantage of SSL is that it is application protocol independent. A higher level protocol can layer on top of the SSL Protocol Transparently." The Transport Layer Security ("TLS") protocol is a successor to SSLv3. It is an IETF RFC rather than a defacto industry standard. The server browser preferably supports SSL version 3.0 or later.

The present embodiments, described herein as exemplary embodiments, provide a unique approach to mobilizing critical enterprise content and applications without customizations. By transforming and adapting data content in real-time, dynamic information that is organized particularly for small-screened, wireless devices can be delivered. The present embodiments optimize and organize data content such as Internet content, preferably eliminating the need for custom programming or "mirrored" Web sites in non-traditional markup languages such as WML, HDML, C-HTML or XML. Markup languages such as HTML, JavaScript and WML content can be read and transform the existing content into either XML or WML to adapt to the ergonomics of handheld devices, so no additional development costs are incurred.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system and method for compressing and decompressing a binary code image may be embodied in a computer program product that includes a computer usable medium. For example, such as, a computer usable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A system for accessing information content, the system comprising:
   a server browser for accessing the information content;
   a client browser for navigating the accessed information content, wherein the client browser is hosted on a wireless device; and
   a serializer for dynamically formatting the accessed information content according to an appropriate markup language for the client browser and according to capabilities of the client browser, wherein the server browser and the client browser distribute a set of tasks to format the information content so that both the client browser and the server browser format portions of the information content for display on the client browser, wherein the server browser determines which tasks are performed by the client browser by determining if the server browser can perform the tasks more efficiently, and wherein the server browser performs more formatting tasks than the client browser thereby accelerating delivery of the information content to the client browser.

2. The system of claim 1 wherein the serializer dynamically customizes the format of the information content as appropriate for the specific client browser and applications that run on the client browser.

3. The system of claim 1 wherein the serializer dynamically formats the accessed information content for a second client browser that utilizes a markup language different from the client browser.

4. The system of claim 1 wherein the serializer dynamically formats a portion of the accessed information content, and wherein the portion of accessed information content is requested by the client browser.

5. The system of claim 1 further comprising
   a network between the serializer and the client browser;
   wherein the serializer partitions the information content into groups of information content appropriate for transmission over the network.

6. The system of claim 1 further comprising
   a network between the serializer and the client browser;
   wherein the serializer partitions the information content into groups of information content appropriate for receiving at the client browser.

7. The system of claim 1 wherein the client browser interacts with an application, wherein the application comprises an email application, instant messaging, address book, bar-code device interface, calendar, or radio coverage.

8. The system of claim 1,
   wherein the client browser navigates the information content according to specific abilities of the wireless device comprising navigational tools.

9. The system of claim 1 wherein the information content is dynamically generated.

10. The system of claim 1 wherein the server browser temporarily stores the accessed information.

11. The system of claim 1 wherein the client browser temporarily stores a requested portion of the accessed information content.

12. The system of claim 1 wherein the server browser and client browser are hosted on separate platforms.

13. The system of claim 1 wherein the server browser is hosted on a server.

14. The system of claim 1 wherein the server browser and the client browser are hosted on the same platform.

15. The system of claim 1 wherein the client browser and the server browser are hosted on the wireless device.

16. The system of claim 1 wherein the wireless device comprises a personal digital assistant (PDA), mobile telephone, or a home appliance.

17. The system of claim 1 wherein the client browser can present folderized portions of the accessed information.

18. The system of claim 1 wherein the client browser can process an audio input signal to accesses information content.

19. The system of claim 1 wherein the client browser utilizes a markup language comprising wireless markup language (WML), extensible markup language (XML), or voiceXML.

20. The system of claim 1, wherein information content utilizes a markup language comprising wireless markup language (WML), hypertext markup language (HTML), extensible markup language (XML), or voiceXML.

21. The system of claim 1 wherein the information content information comprises image, video, or audio content.

22. The system of claim 1 wherein the server browser supports scripting code comprising Java Script or Jscript.

23. The system of claim 1 wherein the client browser comprises a microgateway, and wherein other browsers can utilize the microgateway to access the information content.

24. The system of claim 1 wherein the server browser can send information content to the client browser.

25. The system of claim 1, further comprising:
   an event translator for converting a request from the client browser into an event recognizable by the server browser.

26. The system of claim 1, further comprising:
   an event translator for converting a response from the server browser into an event recognizable by the client browser.

27. The system of claim 1 wherein the server browser determines which tasks are performed by the client browser by determining which tasks the client browser may perform.

28. The system of claim 1 wherein the server browser determines which tasks are performed by the client browser based on a type of transmission network used for delivery of the information content to the client browser.

29. A system for accessing information content, the system comprising:
   a server browser for accessing the information content;
   a client browser for navigating the accessed information content, wherein the client browser is hosted on a wireless device; and
   a serializer for dynamically formatting the accessed information content according to an appropriate markup language for the client browser and according to capabilities of the client browser, wherein the server browser and the client browser distribute a set of tasks to format the information content so that both the client browser and the server browser format portions of the information content for display on the client browser, wherein the server browser determines which tasks are performed by the client browser by determining if formatting of the information content by the server browser lessens an amount of bandwidth needed to deliver the information content to the client browser, and wherein the server browser performs more formatting tasks than the client browser thereby accelerating delivery of the information content to the client browser.

30. The system of claim 29 wherein the serializer dynamically customizes the format of the information content as appropriate for the specific client browser and applications that run on the client browser.

31. The system of claim 29 wherein the serializer dynamically formats the accessed information content for a second client browser that utilizes a markup language different from the client browser.

32. The system of claim 29 wherein the serializer dynamically formats a portion of the accessed information content, and wherein the portion of accessed information content is requested by the client browser.

33. The system of claim 29 further comprising
a network between the serializer and the client browser;
wherein the serializer partitions the information content into groups of information content appropriate for transmission over the network.

34. The system of claim 29 further comprising
a network between the serializer and the client browser;
wherein the serializer partitions the information content into groups of information content appropriate for receiving at the client browser.

35. The system of claim 29 wherein the client browser interacts with an application, wherein the application comprises an email application, instant messaging, address book, bar-code device interface, calendar, or radio coverage.

36. The system of claim 29,
wherein the client browser navigates the information content according to specific abilities of the wireless device comprising navigational tools.

37. The system of claim 29 wherein the information content is dynamically generated.

38. The system of claim 29 wherein the server browser temporarily stores the accessed information.

39. The system of claim 29 wherein the client browser temporarily stores a requested portion of the accessed information content.

40. The system of claim 29 wherein the server browser and client browser are hosted on separate platforms.

41. The system of claim 29 wherein the server browser is hosted on a server.

42. The system of claim 29 wherein the server browser and the client browser are hosted on the same platform.

43. The system of claim 29 wherein the client browser and the server browser are hosted on the wireless device.

44. The system of claim 29 wherein the wireless device comprises a personal digital assistant (PDA), mobile telephone, or a home appliance.

45. The system of claim 29 wherein the client browser can present folderized portions of the accessed information.

46. The system of claim 29 wherein the client browser can process an audio input signal to accesses information content.

47. The system of claim 29 wherein the client browser utilizes a markup language comprising wireless markup language (WML), extensible markup language (XML), or voiceXML.

48. The system of claim 29, wherein information content utilizes a markup language comprising wireless markup language (WML), hypertext markup language (HTML), extensible markup language (XML), or voiceXML.

49. The system of claim 29 wherein the information content information comprises image, video, or audio content.

50. The system of claim 29 wherein the server browser supports scripting code comprising Java Script or Jscript.

51. The system of claim 29 wherein the client browser comprises a microgateway, and wherein other browsers can utilize the microgateway to access the information content.

52. The system of claim 29 wherein the server browser can send information content to the client browser.

53. The system of claim 29, further comprising:
an event translator for converting a request from the client browser into an event recognizable by the server browser.

54. The system of claim 29, further comprising:
an event translator for converting a response from the server browser into an event recognizable by the client browser.

55. The system of claim 29 wherein the server browser determines which tasks are performed by the client browser by determining which tasks the client browser may perform.

56. The system of claim 29 wherein the server browser determines which tasks are performed by the client browser based on a type of transmission network used for delivery of the information content to the client browser.

* * * * *